US008888579B2

(12) United States Patent
Beaulieu et al.

(10) Patent No.: US 8,888,579 B2
(45) Date of Patent: Nov. 18, 2014

(54) GAMING METHOD AND GAMING APPARATUS WITH IN-GAME PLAYER STIMULATION

(75) Inventors: Nicole Beaulieu, Reno, NV (US); Steven G. LeMay, Reno, NV (US); Jamal Benbrahim, Reno, NV (US)

(73) Assignee: IGT, Las Vegas, NV (US)

( * ) Notice: Subject to any disclaimer, the term of this patent is extended or adjusted under 35 U.S.C. 154(b) by 989 days.

(21) Appl. No.: 10/879,772

(22) Filed: Jun. 29, 2004

(65) Prior Publication Data

US 2004/0235558 A1 Nov. 25, 2004

Related U.S. Application Data

(63) Continuation of application No. 09/910,507, filed on Jul. 19, 2001, now abandoned.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.

CPC ........ *G07F 17/3227* (2013.01); *G07F 17/3213* (2013.01); *G07F 17/32* (2013.01)

USPC ................................................ 463/20; 463/31

(58) Field of Classification Search

CPC ... G07F 17/326; G07F 17/32; G07F 17/3227; G07F 17/3213

USPC ................................................ 463/16–20, 42

See application file for complete search history.

(56) References Cited

U.S. PATENT DOCUMENTS 5,100,137 A 3/1992 Fulton ............................ 463/13
5,152,529 A 10/1992 Okada .......................... 273/143

(Continued)

FOREIGN PATENT DOCUMENTS

AU B-1331/88 9/1988
DE 197 18 715 11/1998

(Continued)

OTHER PUBLICATIONS

Adams Family, IGT, (1999).

(Continued)

*Primary Examiner* — Kevin Y Kim

(74) *Attorney, Agent, or Firm* — Neal, Gerber & Eisenberg LLP

(57) ABSTRACT

A method for operating a gaming apparatus includes displaying a set of stopped reels in place of one or more spinning reels, each stopped reel having at least one symbol thereon and the total number of stopped reels being less than the total number of reels originally spinning. The method also includes determining an in-game outcome associated with a configuration of the symbols on the set of stopped reels, and providing an in-game stimulation selected from the group consisting of a 3-dimensional aural stimulation, a visual stimulation, a value stimulation and a physical stimulation according to the in-game outcome. The method further includes displaying stopped reels in place of all of the spinning reels, determining a game outcome associated with the configuration of the symbols on all of the stopped reels, and determining a value payout based on the game outcome. The apparatus is also included.

13 Claims, 17 Drawing Sheets

(56) References Cited

U.S. PATENT DOCUMENTS

| | | | | |
|---|---|---|---|---|
| 5,429,507 | A * | 7/1995 | Kaplan | 463/30 |
| 5,511,781 | A | 4/1996 | Wood et al. | 273/85 |
| 5,633,993 | A | 5/1997 | Redmann et al. | 345/419 |
| 5,695,188 | A | 12/1997 | Ishibashi | 273/143 R |
| 5,720,662 | A * | 2/1998 | Holmes et al. | 463/20 |
| 5,766,074 | A | 6/1998 | Cannon et al. | 463/16 |
| 5,766,076 | A * | 6/1998 | Pease et al. | 463/27 |
| 5,807,177 | A | 9/1998 | Takemoto et al. | 463/47 |
| 5,855,515 | A | 1/1999 | Pease et al. | 463/27 |
| 5,876,284 | A | 3/1999 | Acres et al. | 463/25 |
| 5,882,259 | A | 3/1999 | Holmes, Jr. et al. | 463/13 |
| 5,882,261 | A * | 3/1999 | Adams | 463/20 |
| 5,967,518 | A | 10/1999 | Rowe | |
| 6,027,115 | A | 2/2000 | Griswold et al. | 273/143 |
| 6,048,269 | A | 4/2000 | Burns et al. | |
| 6,089,976 | A | 7/2000 | Schneider et al. | |
| 6,159,097 | A | 12/2000 | Gura | |
| 6,203,429 | B1 | 3/2001 | Demar et al. | |
| 6,213,875 | B1 | 4/2001 | Suzuki | 463/20 |
| 6,224,482 | B1 | 5/2001 | Bennett | 463/20 |
| 6,251,013 | B1 | 6/2001 | Bennett | 463/13 |
| 6,270,411 | B1 | 8/2001 | Gura et al. | 463/20 |
| 6,270,412 | B1 * | 8/2001 | Crawford et al. | 463/20 |
| 6,279,902 | B1 | 8/2001 | Yamazaki et al. | 273/108 |
| 6,309,301 | B1 | 10/2001 | Sano | 463/35 |
| 6,411,276 | B1 | 6/2002 | Braun et al. | 345/156 |
| 6,416,409 | B1 * | 7/2002 | Jordan | 463/27 |
| 6,537,150 | B1 | 3/2003 | Luciano et al. | 463/16 |
| 6,612,927 | B1 * | 9/2003 | Slomiany et al. | 463/16 |
| 6,739,973 | B1 * | 5/2004 | Lucchesi et al. | 463/35 |
| 6,939,226 | B1 | 9/2005 | Joshi | |
| 7,258,613 | B2 | 8/2007 | Lucchesi et al. | |
| 8,016,674 | B2 | 9/2011 | Lucchesi et al. | |
| 8,408,996 | B2 | 4/2013 | Lucchesi et al. | |
| 2003/0064782 | A1 | 4/2003 | Beaulieu et al. | |

FOREIGN PATENT DOCUMENTS

| | | |
|---|---|---|
| EP | 0 840 256 | 5/1998 |
| EP | 0 997 856 | 5/2000 |
| EP | 1 054 368 | 11/2000 |
| EP | 1 082 979 | 3/2001 |
| EP | 1 083 531 | 3/2001 |
| GB | 2 193 441 | 2/1988 |
| WO | WO 99/10849 | 3/1999 |
| WO | WO 01/74464 | 10/2001 |
| WO | WO03/008056 A2 | 1/2003 |

OTHER PUBLICATIONS

Legato, "Creepy and Kooky; IGT's 'The Addams Family' mine '60s-sitcom culture to create a wildly entertaining slot," Strictly Slots, vol. 2, No. 8 (Jul. 2000).
International Search Report (counterpart PCT application).
Written Opinion (counterpart PCT application).
International Preliminary Examination Report (counterpart PCT application).
Kansil, 'Bicycle, Official Rules of Card Games', The United States Playing Card Company, Cincinnati, OH, 90$^{th}$ Ed., 2001, pp. 71-72.
Examination Report from counterpart EP application (3 pages).
Canadian Office Action dated Jul. 9, 2008, for related Canadian Patent Application No. 2,453,842. .
Examination Report dated Feb. 9, 2009, for related Australian Patent Application No. 2007203141.
Office Action dated May 11, 2009, for related Canadian Patent Application No. 2,453,842.
Australia Examination Report dated Mar. 5, 2010 from Application No. 2007203141.
Office Action dated Jul. 14, 2010 from Canadian Application No. 2,453,842.
CA Office Action dated Jan. 31, 2012 issued in Application No. 2,453,842.

* cited by examiner

GAMING METHOD AND GAMING APPARATUS WITH IN-GAME PLAYER STIMULATION

This application is a continuation of U.S. application Ser. No. 09/910,507, filed Jul. 19, 2001, which application is incorporated herein by reference in its entirety.

BACKGROUND

The present invention is directed to a gaming method and a gaming apparatus, which could be an individual gaming unit, a gaming system having a plurality of gaming units, or a network-based system (e.g., a LAN (Local Area Network), a WAN (Wide Area Network), an intranet or the Internet) having a plurality of member units, that is capable of player stimulation during game play.

A conventional gaming unit has been provided that includes a display unit that is capable of generating video images, a coin and/or bill acceptor, and a controller with memory and a processor that controls the overall operation of the gaming unit. The controller is programmed to allow a person to make a wager, to determine an outcome of a game, to cause video images to be generated on the display unit, and to determine a value payout associated with the outcome of the game.

Such a conventional gaming unit may be coupled, directly or indirectly, to other gaming units to form a gaming system. One example of a conventional gaming system is disclosed in U.S. Pat. No. 5,855,515 to Pease et al. Pease et al. discloses a progressive gaming system having a plurality of individual gaming units that are operatively linked together to allow the generation of a relatively large progressive jackpot that may be won by one of the players using one of the individual gaming units in the progressive system.

The conventional gaming unit is programmed to display video images representing a game. For example, a video slot machine may initially display images representing spinning reels, and further display images representing an image, such as a cherry, lemon, bar etc., for each simulated reel as that reel "stops" in one or more orders. In the same fashion, a video poker machine may display images representing playing cards that are dealt face-up for the player and face-down for the simulated dealer. In each case, the gaming unit displays the images that correspond directly to the real world gaming devices that they are intended to simulate.

As indicated above, the conventional gaming unit may determine a payout value once at the end of game play. It is also known to provide a poker gaming apparatus which provides a payout based on a first hand, permits the player to discard some of the cards of the first hand and receive a redeal, and then provides a payout based on the combination of the cards held over from the first hand and the redeal. Additionally, it is known to provide a poker gaming apparatus that provides an option for the player to request a payout after any card, and then to either terminate play or to continue to play but with a diminished payout opportunity thereafter. It is further known to provide a pachinko machine which determines whether a payout will be made and then determines which video displays will be presented to the player to signal the player that he or she will or will not receive a payout at the end of game play.

SUMMARY

According to an aspect, a method for operating a gaming apparatus is provided. The method includes displaying a plurality of spinning reel images, each image representing a spinning slot machine reel on a slot machine with a plurality of reels, displaying a set of stopped reel images in place of one or more of the plurality of spinning reel images, each stopped reel image representing a stopped slot machine reel with at least one symbol thereon and the number of stopped reel images in the set of stopped reel images being less than that in the plurality of spinning reel images, determining an in-game outcome associated with a configuration of the symbols on the set of stopped reel images displayed, and providing an in-game stimulation selected from the group consisting of a 3-dimensional aural stimulation, a visual stimulation, a value stimulation and a physical stimulation according to the in-game outcome. The method further includes displaying a plurality of stopped reel images in place of the plurality of the spinning reel images, each stopped reel image representing a stopped slot machine reel with at least one symbol thereon and the plurality of stopped reel images including the set of stopped reel images, determining a game outcome associated with the configuration of the symbols on the plurality of stopped reel images displayed, and determining a value payout based on the game outcome.

According to another aspect, a gaming apparatus capable of playing a game comprising a plurality of game pieces is provided. The gaming apparatus includes a display unit that is capable of generating video images, at least one stimulator selected from the group consisting of a 3-dimensional aural stimulation device, a visual stimulation device, a value payout device, and a physical stimulation device, and a controller operatively coupled to the display unit, the controller comprising a processor and a memory operatively coupled to the processor. The processor is programmed to control the display unit to generate a plurality of spinning reel images, each image representing a spinning slot machine reel on a slot machine with a plurality of reels, control the display unit to generate display a set of stopped reel images in place of one or more of the plurality of spinning reel images, each stopped reel image representing a stopped slot machine reel with at least one symbol thereon and the number of stopped reel images in the set of stopped reel images being less than that in the plurality of spinning reel images, determine an in-game outcome associated with a configuration of the symbols on the set of stopped reel images displayed, and control the at least one stimulator to provide an in-game stimulation selected from the group consisting of a 3-dimensional aural stimulation, a visual stimulation, a value stimulation and a physical stimulation according to the in-game outcome. The processor is also programmed to control the display unit to generate display a plurality of stopped reel images in place of the plurality of the spinning reel images, each stopped reel image representing a stopped slot machine reel with at least one symbol thereon and the plurality of stopped reel images including the set of stopped reel images, determine a game outcome associated with the configuration of the symbols on the plurality of stopped reel images displayed, and determine a value payout based on the game outcome.

The features and advantages of the present invention will be apparent to those of ordinary skill in the art in view of the detailed description of various embodiments, which is made with reference to the drawings, a brief description of which is provided below.

DETAILED DESCRIPTION OF VARIOUS EMBODIMENTS

The structure and operation of an embodiment of a gaming unit 50 is illustrated in FIGS. 1-6.

Figure 1:
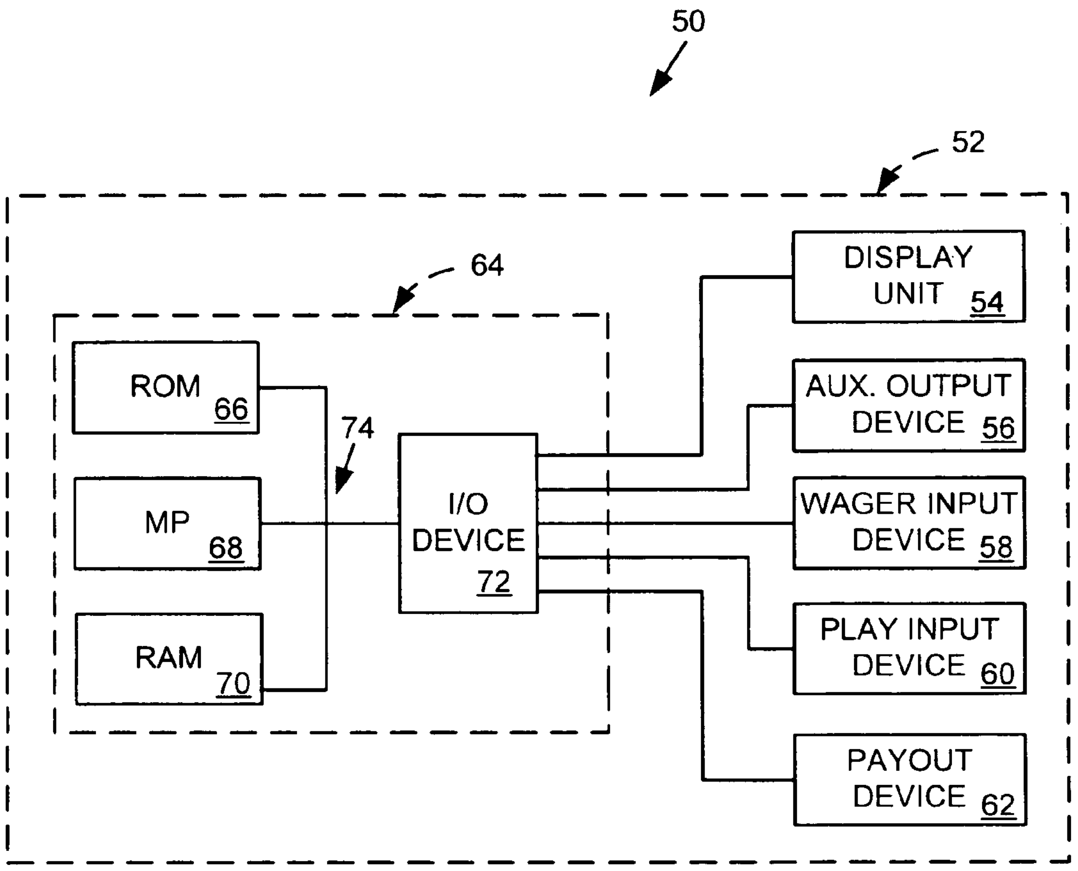
FIG. 1 is a block diagram of an embodiment of a gaming unit.

Referring first to FIG. 1, the gaming unit 50 includes a cabinet 52 (shown schematically). The gaming unit 50 also includes a display unit 54, an auxiliary output device 56, a wager input device 58, a play input device 60, and a payout device 62 mounted to the cabinet 52. The gaming unit also includes a controller 64 (sometimes referred to as a master gaming controller) that may comprise read-only memory (ROM) 66, a microcontroller or microprocessor (MP) 68, random-access memory (RAM) 70 and an input/output (I/O) circuit 72, all of which may be interconnected via an address/data bus 74. Other embodiments may contain mass storage devices, such as hard drives, CD-ROMs, and flash memories.

While the display unit 54, the output device 56, the wager input device 58, the play input device 60, and the payout device 62 are shown coupled to the I/O circuit 72, one or more of these elements may be coupled directly to the microprocessor 68. Alternatively, one or more of the elements may be coupled to the I/O circuit 72 via a bus.

While the gaming unit 50 described above has a display unit 54 that is capable of generating video images and a controller 64 with memories 66, 70 and a processor 68 that controls the operation of the gaming unit 50, the subject matter of the instant disclosure is not so limited. The subject matter of the instant disclosure may embrace other gaming systems and other gaming units that do not utilize a display unit capable of generating video images and/or do not utilize a controller with a memory and a processor that controls the operation of the gaming unit. Consequently, the unit 50 is exemplary without being limiting in this regard.

Figure 2:
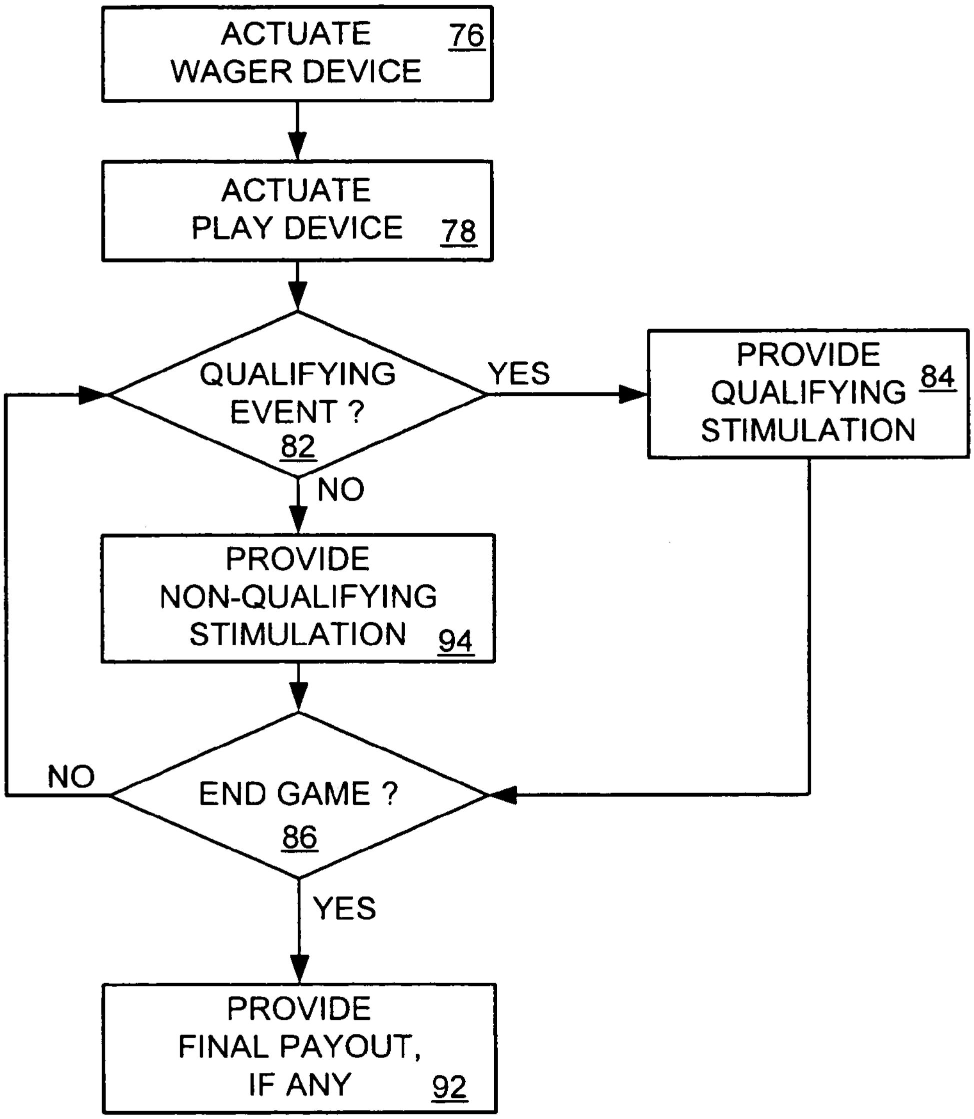
FIG. 2 is a flowchart of a method of operation of the gaming unit of FIG. 1.
Figure 3:
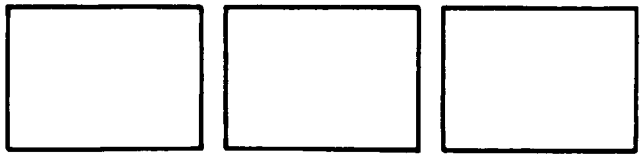
FIG. 3 is an illustration of a visual display that may be displayed when the gaming unit of FIG. 1 operates according to the method of FIG. 2.
Figure 4:
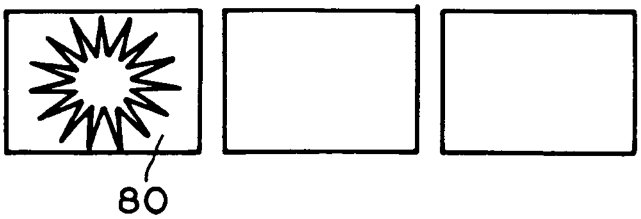
FIG. 4 is an illustration of a visual display that may be displayed when the gaming unit of FIG. 1 operates according to the method of FIG. 2 showing a first image.

Referring now to FIG. 2, the operation of the gaming unit 50 is discussed. At block 76, the player first actuates the wager input device 58 by making a wager, for example, by introducing paper currency, coins, chits, tokens, or cards (such as debit or credit cards) into the wager input device 58 or by performing an electronic funds transfer (EFT) using the wager input device 58. The player then actuates the play input device 60 at block 78 to initiate a game.

According to this embodiment, the gaming unit 50 plays a generic game made up of three game pieces. While reference is made to this exemplary game, any number of games may be played by the gaming unit 50, including slots, poker, blackjack, keno, bingo, etc. Further, while the game in this case includes three game pieces, any number of game pieces could have been used (one, two, four, etc.).

After actuation of the play input device 60, the controller 64 may immediately determine the identities of the three game pieces (e.g., by associating each piece with a randomly assigned number) and whether the configuration of the game pieces should result in a final value payout or not (e.g., by comparing the configuration of random numbers thus generated against values stored in a table)—i.e., the game outcome. The configurations for comparison may be predetermined or preselected for all games played of that type, may change before or after each game played, may be totally random, or may be selectable by the player. The controller 64 may also determine the payout value at this time according to the game outcome and, typically, the amount wagered.

For entertainment purposes, the gaming unit 50 controls the display unit 54 to display three game piece images, each image associated with one of the game pieces. If the configuration of game pieces results in a final payout (a “successful” game outcome), the gaming unit 50 will present a configuration of game piece images that will match one of a set of combinations of game piece images which have been identified to the player as “winning” combinations. Such identification of “winning” combinations may be displayed on signage mounted on or attached to the gaming unit 50, or on the display unit 54 as part of the initial game presentation, as part of a screen saver sequence or as part of an attraction sequence.

After the actuation of the play input device 60, a first game piece image 80 in the form of a sunburst is displayed (see FIG. 4) and the controller 64 determines an in-game outcome based on whether the first game piece image represents a potential winning configuration (or, as the player would see it, if the first game piece image 80 matches a first image in a ‘winning’ combination) at a block 82. If it is determined that the game piece represents a potential winning configuration, the controller 64 controls one or more of the display unit 54, the output device 56 and the payout device 62 to provide a stimulation to the player at block 84.

Alternatively, the determinations of whether stimulations should be provided for any set of game pieces (including for a set having a single game piece) may be made before any of the game piece images are displayed. In such a case, the controller 64 is programmed to initially determine the in-game outcomes, and then to control the display unit 54 to display each game piece image and the display unit 54, the auxiliary output device 56, and the payout device 62 to provide the appropriate stimulations according to the in-game outcomes at the appropriate times.

Illustratively, the controller 64 may control the display unit 54, the auxiliary output device 56, and the payout device 62 to provide the stimulations by animating or altering the game piece image 80 (e.g., causing an increase in the number of rays emanating from the sunburst), by causing the auxiliary output device 56 (e.g., a bell) to sound, and/or by providing a payout via the payout device 62. As a consequence of permitting more than one stimulation to be provided in response to a given event, it may be necessary to prioritize the stimulations. That is, to prevent too many stimulations from being provided at the same time and thereby conflicting with each other, the controller 64 may be programmed to rank the stimulations. This ranking may be based on a predetermined system of values or weights assigned to each stimulation, may be adaptive according to those stimulations already provided, or may be randomly assigned.

Based on this ranking, the controller 64 determines how to provide the stimulations. For example, the controller 64 may control the output devices (such as the display unit 54, the auxiliary output device 56, and the payout device 62) to provide the stimulations sequentially rather than simultaneously. Alternatively, the controller 64 may be programmed to omit the stimulations that received a lower relative ranking. As a further alternative, the controller 64 may be programmed to combine the stimulations so as to provide different stimulations that may vary from stimulations that are simple combinations of the individual stimulations (e.g., the individual notes may be combined into a chord) to stimulations which are of a different type or characteristic that either of the individual stimulations that would have been provided (e.g., an animated female figure dancing with a basket of fruit balanced on her head may be substituted for an animated banana, an animated cherry, and a musical stimulation).

The controller 64 may control the display unit 54, the auxiliary output device 56 and the payout device 62 by providing specific instructions to controllers operatively associated with each unit or device. Alternatively and preferably, the gaming unit 50 uses an event-based triggering system that permits a modular approach to be implemented.

According to an embodiment of such an event-based triggering system, upon determining the game outcome, for example, the controller 64 generates an event that is communicated to the display unit 54, the auxiliary output device 56 and the payout device 62. Each unit or device in turn determines if the communicated event has significance for that unit or device and what that significance may be. As a consequence, units or devices may be added or removed from the gaming unit 50 without requiring significant reprogramming of the controller 64.

More particularly, according to an embodiment of such a system, the controller 64 may generate events representative of the game outcome and the in-game outcomes. The event associated with the game outcome may be representative of a win, while the events associated with the in-game outcomes consequently may be representative of potential winning combinations leading up to the winning combination. When these events are provided to each of the display unit 54, the auxiliary output device 56, and the payout device 62, these events may act as a trigger, causing a controller associated with each unit or device to respond accordingly. For example, upon receiving a potential winning combination trigger event, the display unit 54 may display animated versions of the game piece images and the auxiliary output device 56 may provide additional aural, visual, or physical stimulations.

In such an event-based system, it is further possible for the events themselves to cause additional events to be generated. For example, the events generated in one game combined with those generated in another game may result in the generation of a further set of events. The further set of events is then used trigger the display unit 54, the auxiliary output device 56 and the payout device 62. Following such a method, different stimulations, different levels of stimulation or different sequences of stimulations may be provided in successive games, Within a number of games or within a time period. As a particular example, a player may initially input a certain value into the gaming unit 50, and as that value is decreased through a series of games wherein the game pieces are in non-winning configurations, the events may be combined in successive games and new events generated such that the stimulations triggered by these later generated events may become more intense (e.g., colors become brighter, sounds louder) as a signal to the player to input additional value.

Figure 5:
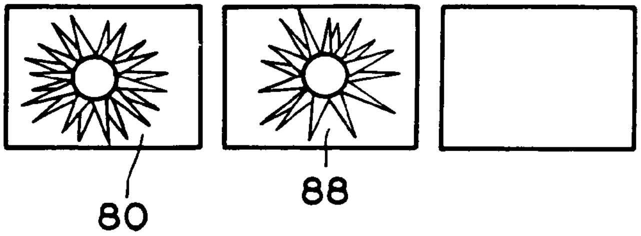
FIG. 5 is an illustration of a visual display that maybe displayed when the gaming unit of FIG. 1 operates according to the method of FIG. 2 showing first and second animated game piece images.
Figure 6:
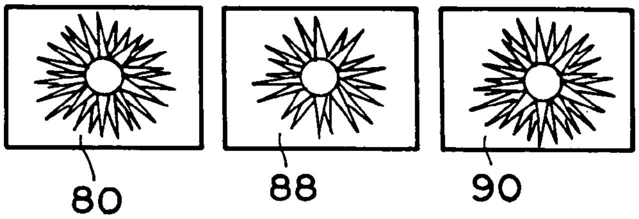
FIG. 6 is an illustration of a visual display that may be displayed when the gaming unit of FIG. 1 operates according to the method of FIG. 2 showing first, second and third animated game piece images.

Returning to FIG. 2, the controller 64 determines at block 86 that the game has not yet been completed (i.e. not all three game piece images have been displayed). The controller 64 may then determine if the other two game pieces in combination with the first game piece image correspond to winning or potential winning configurations and control the display unit 54 to display the next two game piece images 88, 90. In this example, the controller 64 would determine that the game pieces do form winning or potential winning combinations (or, the game piece images 88, 90 match the corresponding images from a "winning" combination of images), so additional stimulations are provided. As shown in FIGS. 5 and 6, the number of rays emanating from the sunburst images 80, 88, 90 are progressively increased. That is, the stimulations "build" or are "heightened." When the controller 64 determines that the end of game play has been reached, the controller 64 controls the payout device 62 at block 92 to provide the appropriate payout (varying from a zero value payout to the maximum value payout) either in paper currency, coins, etc. or to a credit counter.

Even if the controller 64 determines that the game pieces are not configured according to a winning or potential winning configuration (one or more of the game piece images 80, 88, 90 do not "match" the winning combination), the controller may still provide a stimulation at block 94. For example, a different animation or sound may be provided than that provided when the game piece images are correctly matched. Alternatively, a different value payout may be made.

By providing stimulations during the game, it is believed that the player will remain interested in the game. While it is most preferable to provide continuous stimulation and to make the stimulations build for successful game outcomes (non-zero payouts at the end of game play), other variations are encompassed by this disclosure. For example, stimulations may be provided only for winning or potential winning configurations. Also, the same stimulation may be provided whether the game pieces represent a winning configuration or a non-winning ("losing") configuration.

Additionally, by providing stimulation without requiring further input from the player as to the player's desire to continue with the game or receive a stimulation, the discontinuity of gaming systems which repeatedly inquire of the player's desire to continue the game is avoided. It is believed that such discontinuity may adversely affect the player's enjoyment of the game, and consequently the player's willingness to continue playing additional games at the apparatus at the present time or in the future. Additionally, the problem of misconstruing the player's desire to continue game play is avoided by not requiring the user to signal the desire to continue game play after every receipt of stimulation.

The structure and operation of an embodiment of a gaming system 100 including gaming units 102, similar to the gaming unit 50, is now discussed with reference to FIGS. 7-21. The gaming system 100 may include a plurality of the gaming units 102—for example, a first gaming unit 102*a*, a second gaming unit 102*b*, and a third gaming unit 102*c*. Although three gaming units 102 are shown, more gaming units could be included in the system 100.

Figure 7A:
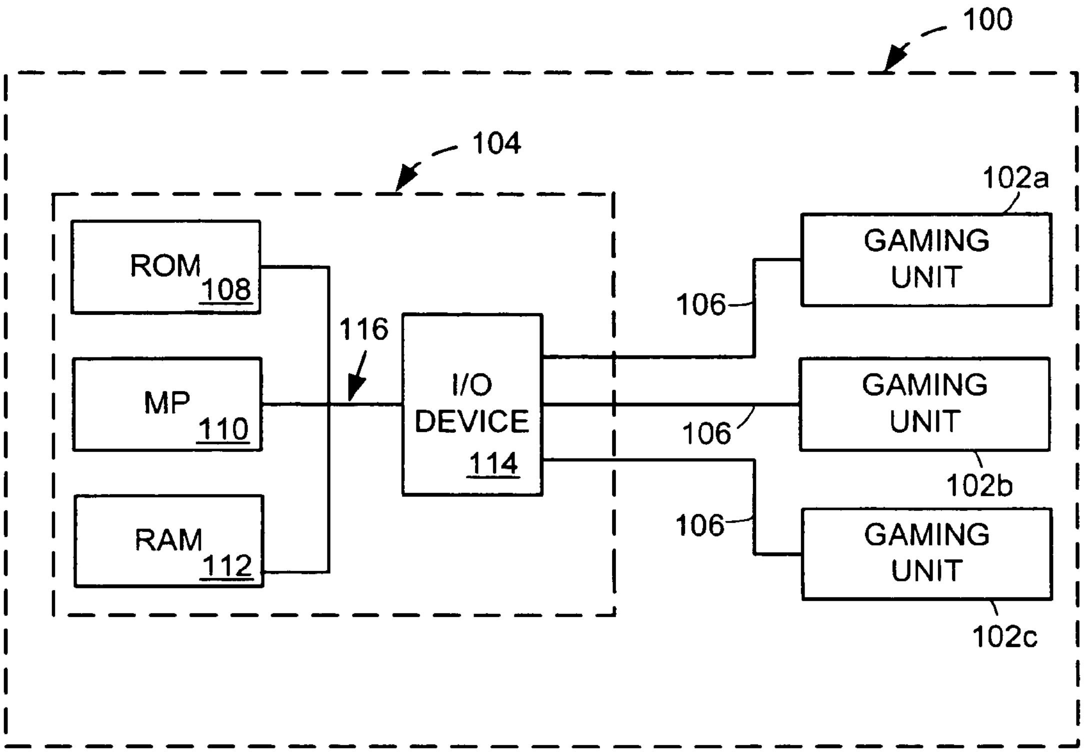
FIG. 7*a* is a block diagram of an embodiment of a gaming system having a plurality of gaming units.

As shown in FIG. 7*a*, each of the gaming units 102 may be connected to a central computer or controller 104 via a respective data link 106, which may be provided as, for example, a hardwired link, a wireless link, a fiber optic link or a network connection, such as a connection via the Internet. Although three separate data links 106 are shown in FIG. 1, the data links 106 could be provided in the form of a single bus or network which may could be connected (via a hardwired link, a wireless link, a fiber optic link or a network connection via a LAN, a WAN, an intranet or the Internet) to the central controller 104. In such a system 100, the units 102 may operate under the control of and/or utilize software, which may include data files, binary files, scripts, data tables, graphic file formats, 3D models, etc., stored on the central computer or controller 104 or available via a network when stored remotely.

As further illustrated in FIG. 7*a*, the central controller 102 may include a read-only memory (ROM) 108, a microcontroller or microprocessor (MP) 110, a random-access memory (RAM) 112 and an input/output (I/O) circuit 114, all of which may be interconnected via an address/data bus 116. It should be appreciated that although only one microprocessor 110 is shown, the controller 104 could include multiple microprocessors 110. Similarly, the memory of the controller 104 could include multiple RAMs 112 and multiple ROMs 108. Although the I/O circuit 114 is shown as a single block, it should be appreciated that the I/O circuit 114 could include a number of different types of I/O circuits. The RAM(s) 112 and ROM(s) 108 could be implemented as semiconductor memories, magnetically readable memories, and/or optically readable memories, for example.

Figure 7B:
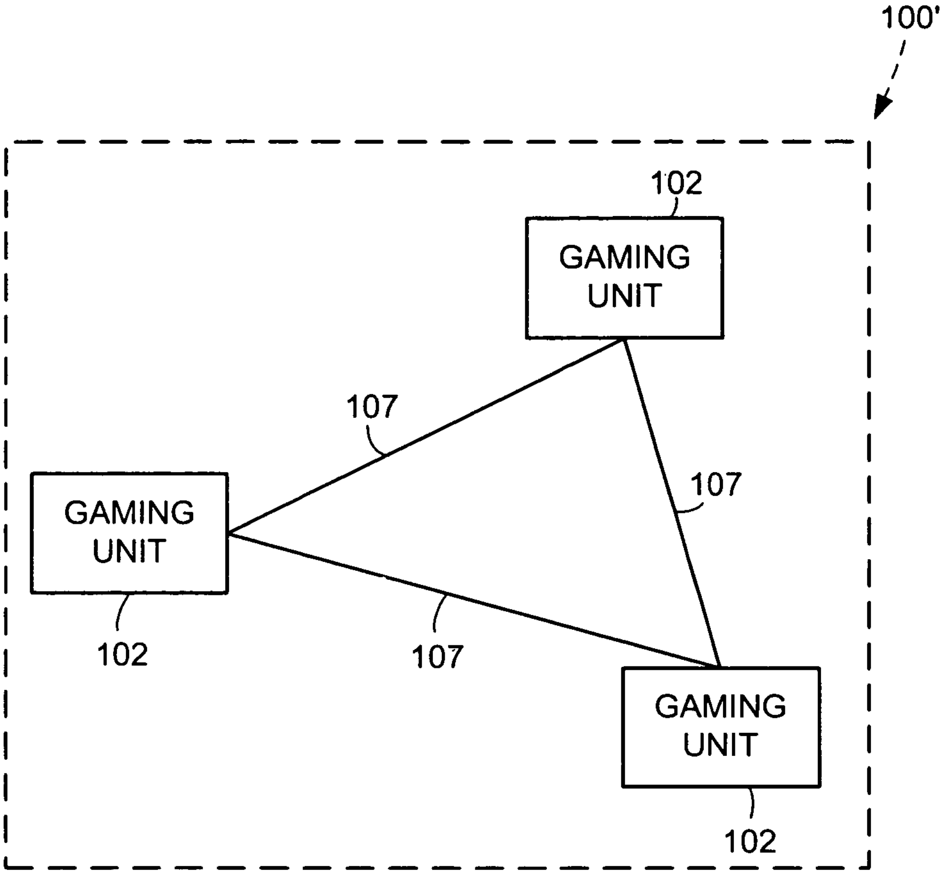
FIG. 7*b* is a block diagram of an alternative embodiment of a gaming system having a plurality of gaming units.

As a further alternative, the game play of gaming units 102 may be connected or coordinated without the use of a central computer or controller 104. As shown in FIG. 7*b*, a system 100' is presented wherein the units 102 are coupled together using links 107, which may be hardwired links, wireless links, fiber optic links or network connections, rather than to a central computer or controller 104. During game play, the processing necessary to play the game at each unit 102 may be shared among the units 102. Such shared processing may be referred to as peer-to-peer networking, and is within the scope of the present invention.

Additionally, by virtue of the linkage of the units 102 in either the system 100 shown in FIG. 7*a* or the system 100' shown in FIG. 7*b*, the game play at one of the units 102 may influence the game play at other of the units 102. For example, success or failure at one of the units 102 may influence the payout or bonus opportunities at the other of the units 102, or the stimulations provided at the other of the units 102. Regarding the later, a stimulation that would typically have been provided for an event occurring at each of the various units 102 if the units 102 were not linked may be provided only at the individual unit 102 where the event first occurred in time or where the player's accumulated value exceeds a threshold value. Alternatively, a stimulation, such as a message, may be displayed on each of the linked units 102 that indicates the relative times at which events are taking place on each of the various units 102, or which game piece images are being displayed on each of the various units 102.

Figure 8:
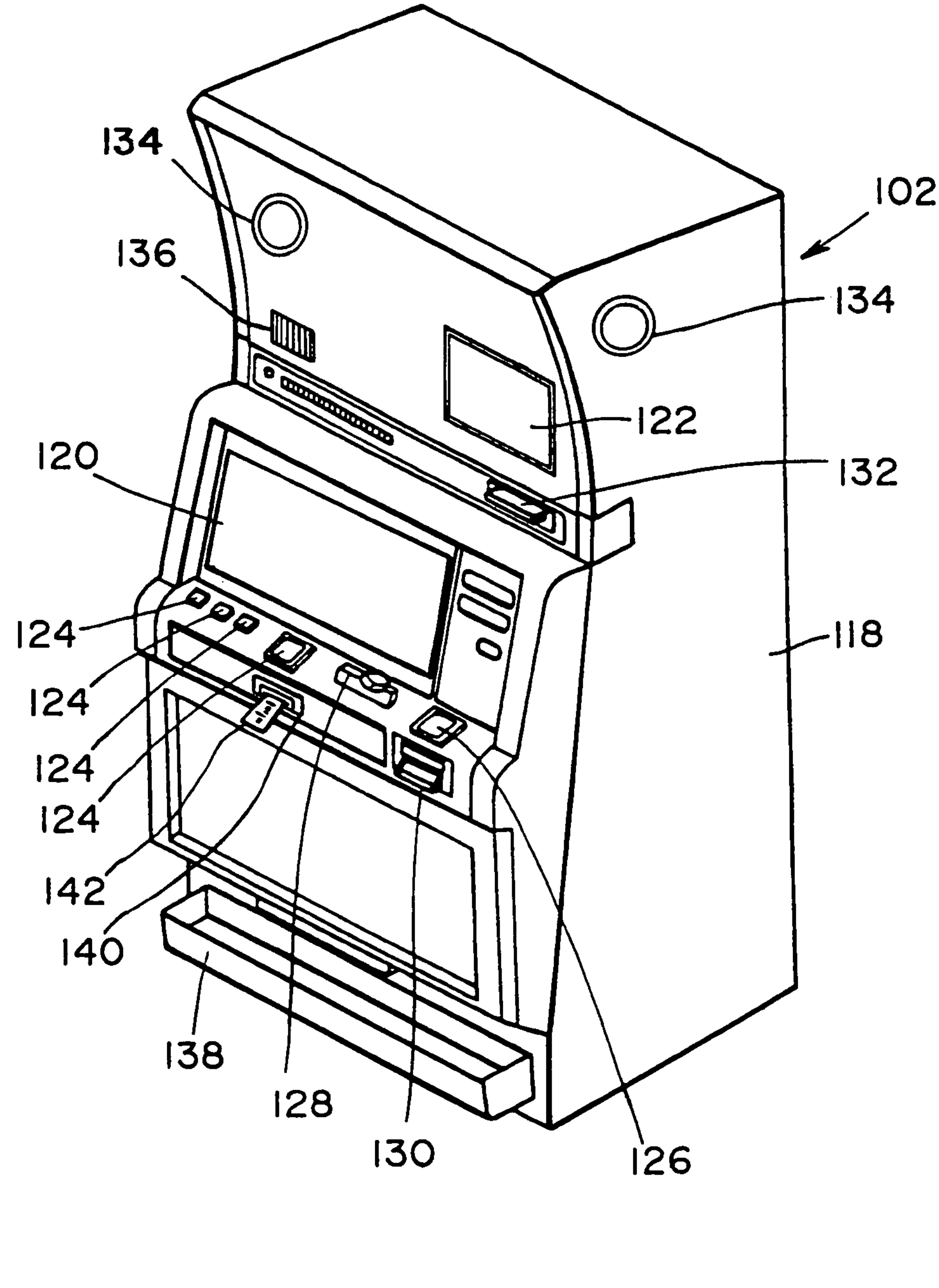
FIG. 8 is a perspective view of an embodiment of a gaming unit for use in the system of FIGS. 7*a* and *b;*

FIG. 8 illustrates an embodiment of the gaming unit 102 in greater detail. Specifically, the embodiment of the gaming unit 102 may include a cabinet 118. A color video display unit 120 and panels 122 are disposed on the front of the cabinet 118 for displaying graphics and information associated with one or more games that a customer may play. The gaming unit 102 may also include a variety of input devices, such as a plurality of buttons 124 that a customer may actuate to make wagers and game-specific selections, such as hold or discard decisions. In addition or in the alternative, the gaming unit 102 may also include other game-specific input devices, such as a "spin" button 126 for slots.

The gaming unit 102 may include a variety of value-accepting mechanisms that may be disposed on the front of the gaming unit 102 or in any other suitable location. The value-accepting mechanisms may include any device that can accept value from or transfer value for a player. As used herein, the term "value" may encompass money denominations or credits, and may be in the form of paper currency, coins, gaming tokens, ticket vouchers, electronic vouchers (stored for example on a card or PDA (Personal Digital Assistant)) or any other suitable object representative of value. For example, the value-accepting mechanisms may include a coin acceptor 128 that accepts coins or tokens; a bill acceptor 130 that accepts and validates paper currency; a card or ticket reader 132 that accepts coupons, credit cards, printed cards, smart cards, ticket vouchers, etc.; an electronic funds transfer (EFT) device; and any other device that may accept or transfer a medium of value.

The gaming unit 102 may include devices in addition to the display unit 120 to enhance a player's game-playing experience, such as one or more audio speakers 134 and an aroma dispenser 136 (manufactured by, for example, MicroScent or DigiScents). The audio speakers 134 and/or the aroma dispenser 136 may be mounted above the display unit 120 or in any other suitable location on the gaming unit 102. Moreover, additional video display units or other visual indicators, such as light bezels, top boxes, and toppers, may be included.

Figure 9:
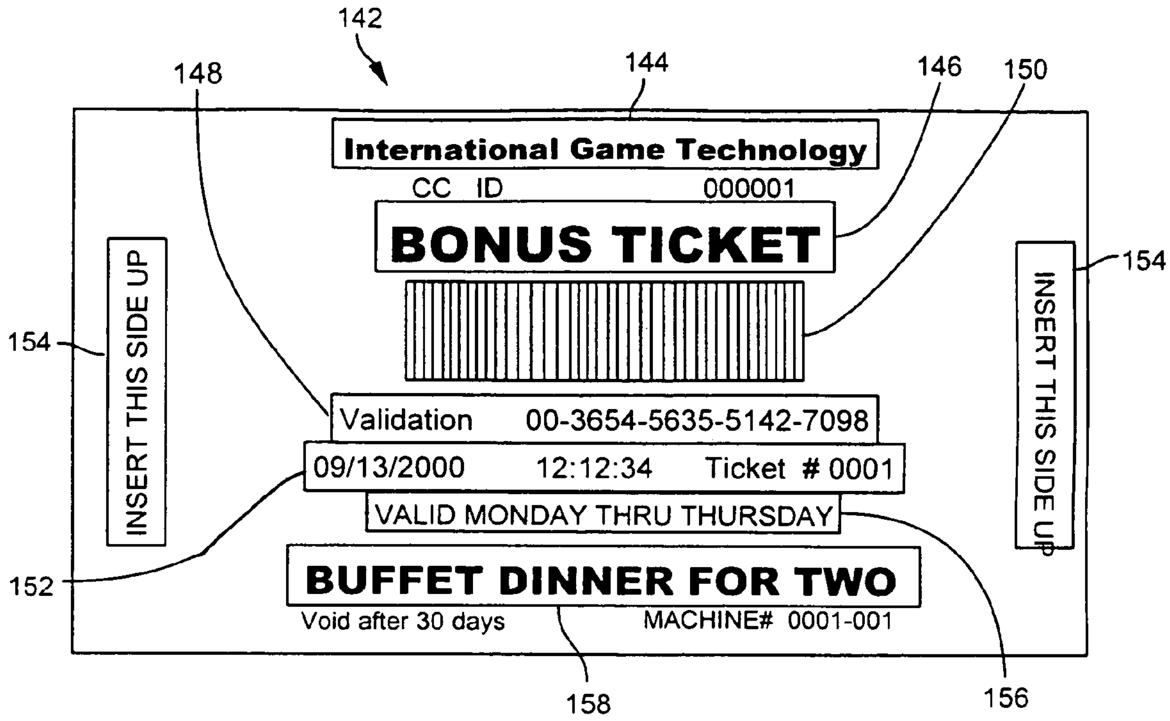
FIG. 9 is an illustration of an embodiment of a ticket used in connection with the gaming unit of FIG. 8.

The gaming unit 102 also includes a payout device, such as a hopper connected to a tray 138 of the type provided on slot machines, for example. The gaming unit 102 may also include a printer 140 disposed on the front of the gaming unit 102 or in any other suitable location. The printer 140 may be used, for example, to print ticket vouchers 142. As illustrated in FIG. 9, the ticket voucher 142 may be composed of paper or another printable material and may have printed information including the casino name 144, the type of ticket voucher 146, a validation number 148, a bar code 150 with control and/or security data, the date and time of issuance 152, redemption instructions 154 and restrictions 156, a description of an award 158, and any other information that may be necessary or desirable. Different types of ticket vouchers could be used, such as merchandise ticket vouchers, bonus ticket vouchers, cash-redemption ticket vouchers, casino chip ticket vouchers, extra game play ticket vouchers, restaurant ticket vouchers, show ticket vouchers, etc. The ticket vouchers could be printed with an optically readable material such as ink, or data on the ticket vouchers could be magnetically encoded. As a further alternative, the payout device may include a circuit capable of performing or a controller programmed to perform an electronic funds transfer (EFT) to the player's bank account or to a virtual account established, for example, on a PDA or at a casino. Such a transfer could be performed over a hardwired, wireless, fiber optic or network connection.

Figure 10:
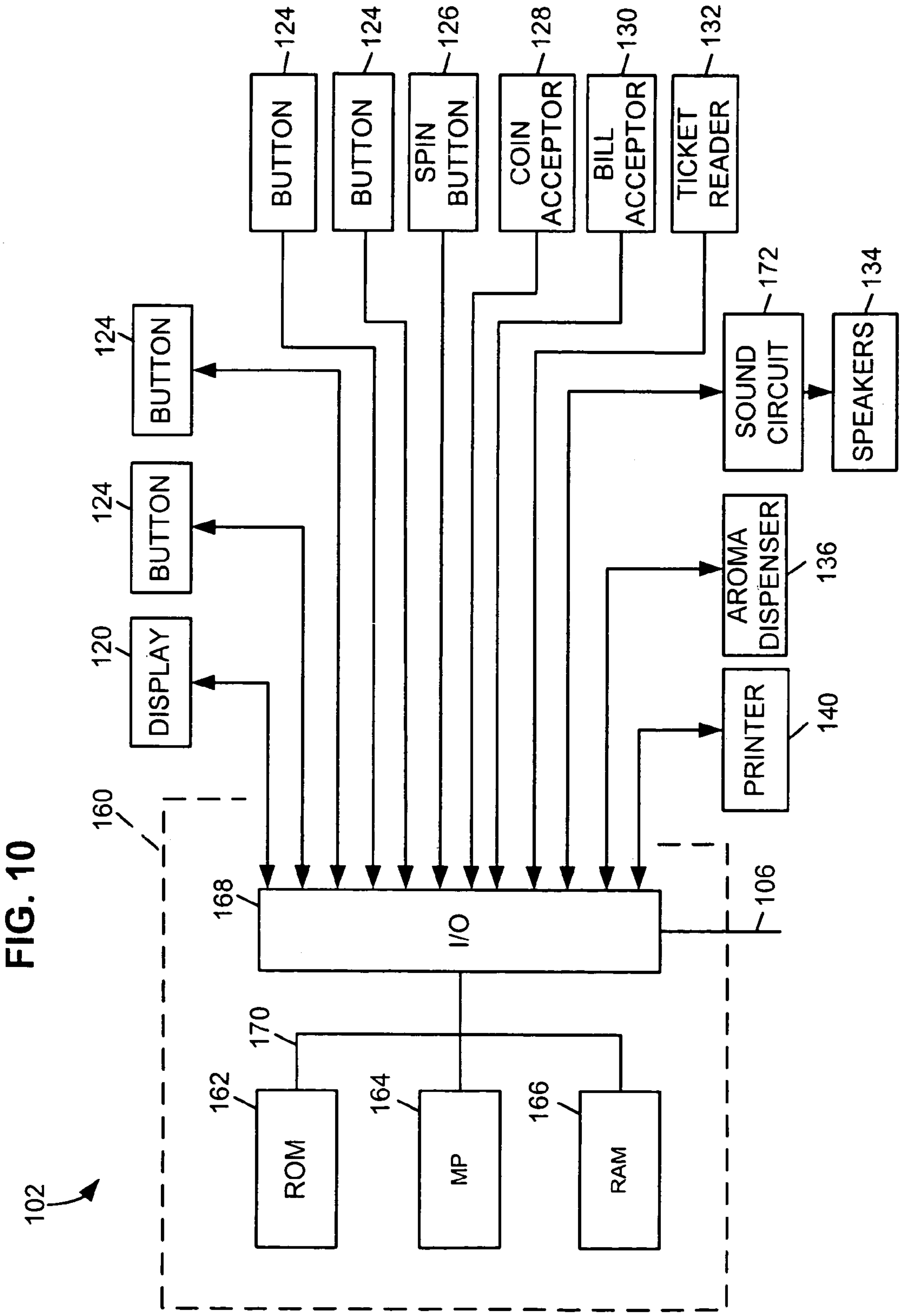
FIG. 10 is a block diagram of the gaming unit of FIG. 8 including a controller.

FIG. 10 is a block diagram of the gaming unit 102 described above, illustrating the elements described above and a controller 160 that is coupled to these elements so as to control the operation of the gaming unit 102, whether directly or under the control of the central controller 104. The controller 160 may comprise read-only memory (ROM) 162, a microcontroller or microprocessor (MP) 164, random-access memory (RAM) 166 and an input/output (I/O) circuit 168, all of which may be interconnected via an address/data bus 170. It should be appreciated that more than one controller 160 may be provided, and although only one microprocessor 164 is shown, the controller 160 could include multiple microprocessors 164. Similarly, the memory of the controller 160 could include multiple RAMs 166 and multiple ROMs 162, or mass storage devices, such as hard drives, CD-ROMs, and flash memories. Moreover, the RAM(s) 166 and ROM(s) 162 could be implemented as semiconductor memories, magnetically readable memories, and/or optically readable memories, for example. Although the I/O circuit 168 is shown as a single block, it should be appreciated that the I/O circuit 168 could include a number of different types of I/O circuits.

FIG. 10 also illustrates that the components illustrated in FIG. 8 could be connected to the I/O circuit 170 via a respective direct line or conductor. Different connection schemes could be used. For example, one or more of the components shown in FIG. 8 could be connected to the I/O circuit 170 via a common bus or other data link that is shared by a number of components. Furthermore, some of the components could be directly connected to the microprocessor 164 without passing through the I/O circuit 170. Additionally, some components, such as the speaker 134, may be coupled to other circuits, such as a sound circuit 172, which are in turn coupled to the I/O circuit 170.

One manner in which the gaming unit 102 may operate is described below in connection with a number of flowcharts that represent a number of portions or routines of one or more computer programs, which may be stored in one or more of the memories of the controller 160. The computer program(s) or portions thereof may be stored remotely, outside of the gaming unit 102, and may control the operation of the gaming unit 102 from a remote location. Such remote control may be facilitated with the use of a wireless connection or by a network interface (represented by the data links 106, 107) that connects each gaming unit 102 with a remote computer (such as the central processor 104) or the other gaming units 102 having memory in which the computer program and/or program portions are stored. The computer program and/or program portions may be written in any high level language such as C, C++, C#, Java, Visual Basic or the like or any low-level, assembly or machine language. By storing the computer program portions therein, various portions of the memories 162, 166 are physically configured, either magnetically (e.g. in the case of a magnetic memory), electrically (e.g. in the case of a semiconductor memory) or structurally (e.g. in the case of an optical memory), in accordance with computer program instructions.

Figure 11:
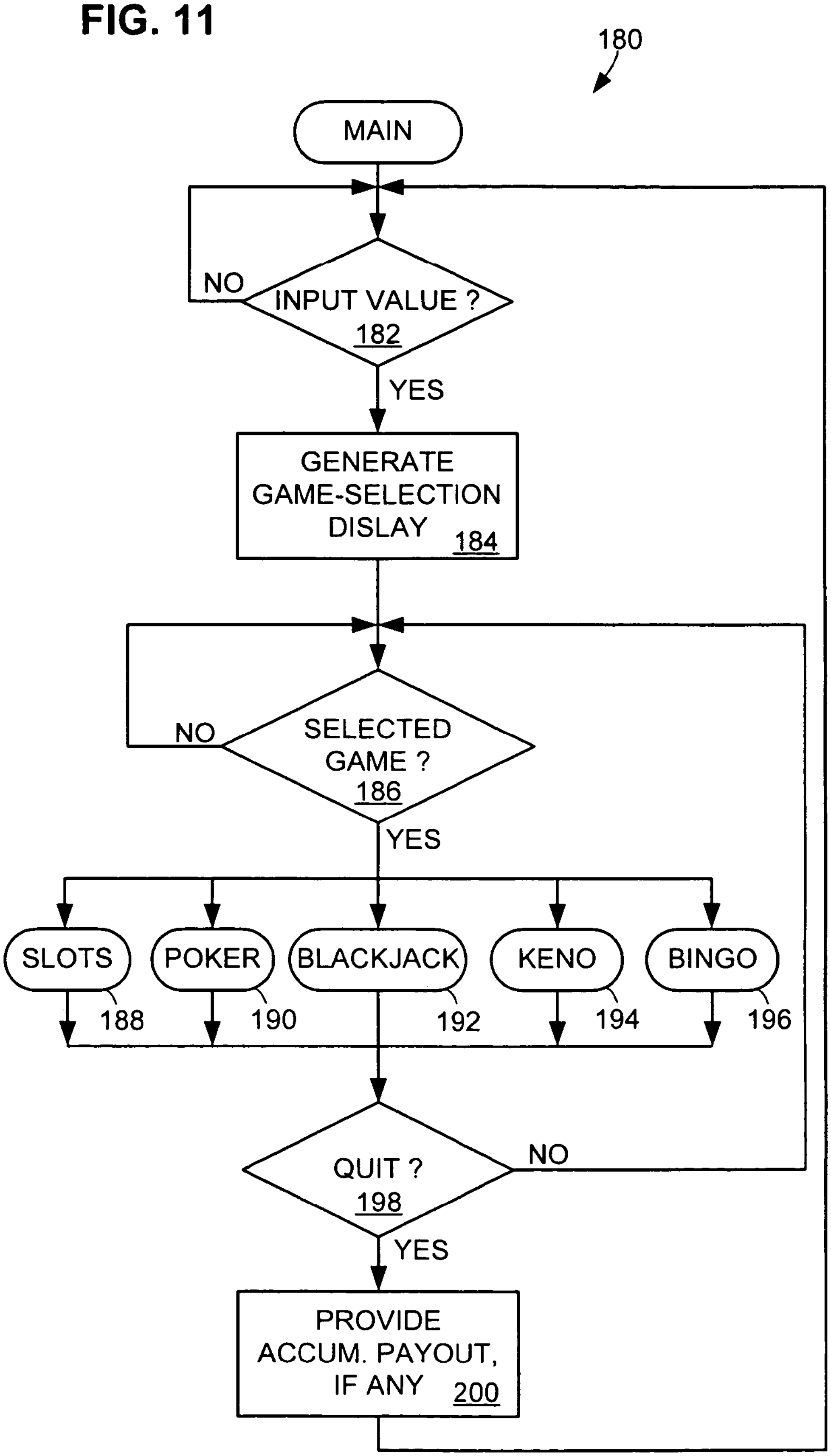
FIG. 11 is a flowchart of a main routine that may be performed by the controller of FIG. 8.

FIG. 11 is a flowchart of a main operating routine 180 that may be stored in the memory of the controller 160. The main routine 180 may begin operation at block 182 with a player making an input to the gaming unit 20, for example by placing value into one of the value-accepting devices 128, 130, 132. At block 184, a game-selection display may be generated on the display unit 80 to allow the player to select a game available on the gaming unit 102. The game-selection display may include, for example, a list of games that may be played on the gaming unit 102.

It should be noted that although five routines are shown in FIG. 11, a different number of routines could be included to allow play of a different number of types of games (e.g., to include dice games, such as craps, in addition to slots, poker, blackjack, keno, and bingo). Alternatively, the gaming unit 102 may be programmed to allow play of only one type of game.

The player then selects one of the games at block 186, the controller 160 executes one of routines 188 (slots), 190 (poker), 192 (blackjack), 194 (keno), 196 (bingo) corresponding to the game selected at block 186. After one of the routines 188, 190, 192, 194, 196 has been performed to allow the player to play one of the games, block 198 may be utilized to determine whether the player wishes to terminate play on the gaming unit 102, has exhausted the value inputted into the gaming unit 102, or wishes to select another game. If the player wishes to stop playing the gaming unit 102, which may be expressed, for example, by selecting a quit graphic displayed on the display unit 120 or through another input device, the controller 160 may dispense to the player at block 200 any accumulated value not previously dispensed, as explained in greater detail below. The operation may then return to block 182 to start the main routine 180 again. If the player did not wish to quit and still has value remaining, as determined at block 198, the program may branch back to block 186 where the game-selection display may again be generated to allow the player to select another game.

The embodiments are now explained with regard to a video slots routine and a video poker routine.

Video Slots

Figure 12:
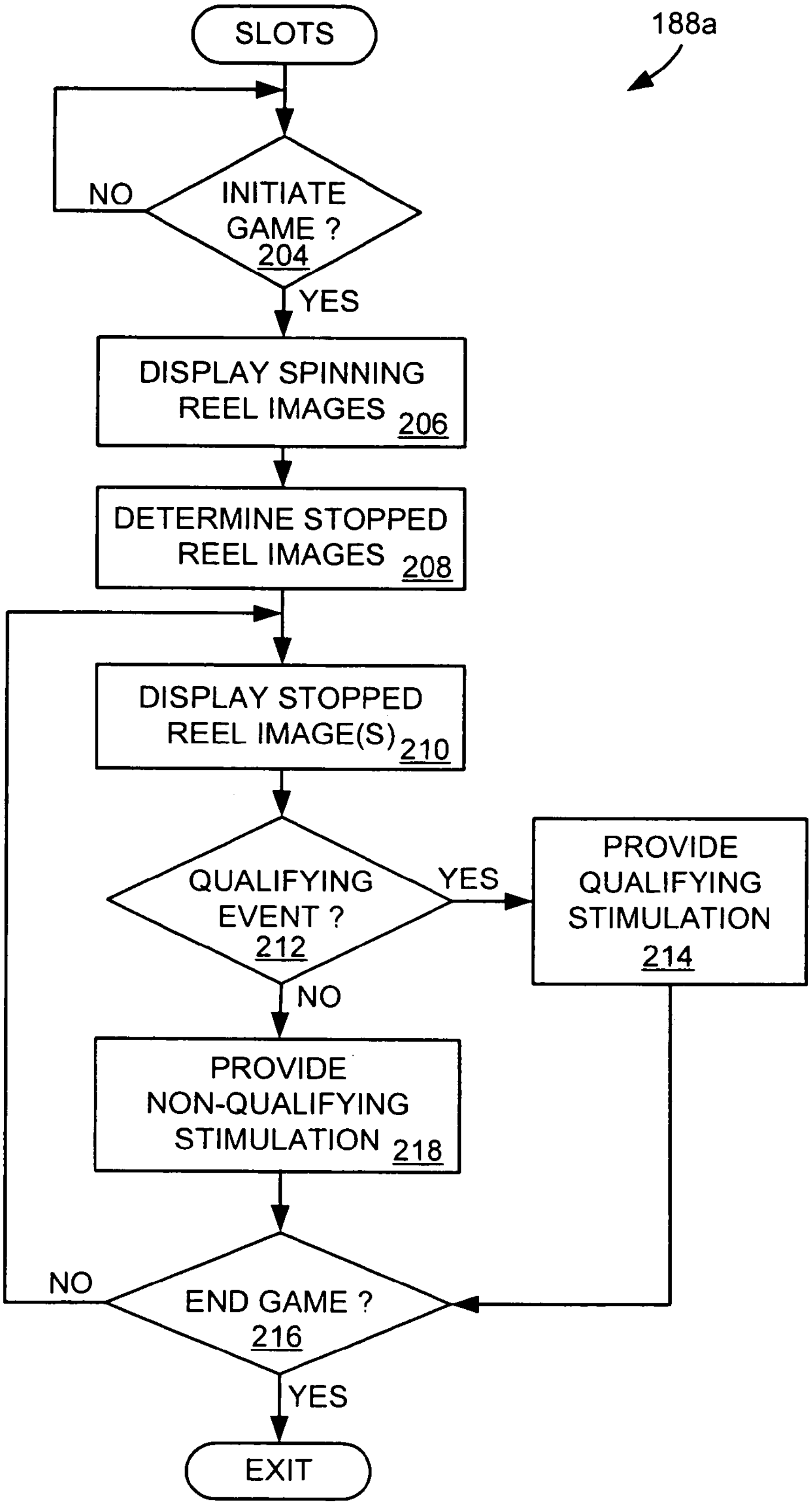
FIG. 12 is a flowchart of a video slots routine that may be performed by the controller of FIG. 8.
Figure 13:
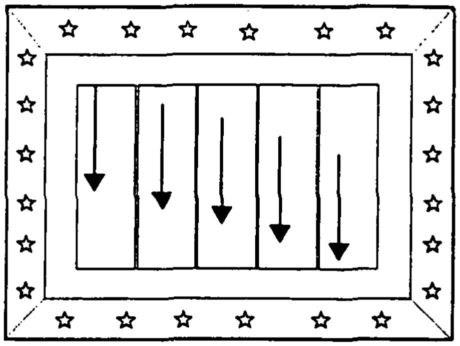
FIG. 13 is an illustration of spinning reel images that may be displayed when the controller of FIG. 8 performs the video slots routine of FIG. 12.

FIG. 12 is a flowchart of an embodiment 188*a* of a video slots routine that begins at block 204 with the player initiating the game, for example, by depressing the game-specific button 126. After the player has initiated the game, at block 206, the controller 160 causes a plurality of game piece images to be generated on the display unit 80 (see FIG. 13). Each game piece image of the plurality of game piece images represents a spinning slot machine reel.

As each reel "spins", the image may be altered or changed in such a manner as to display an image which may be the image displayed on that reel when the reel "stops." As the images corresponding to the possible stopped reels are displayed, additional stimulations may be provided to the player in the form of, for example, aural stimulation (e.g., 3-dimensional sound effects or a Doppler sound effect) and/or visual stimulation (e.g., through the use of light bezel displays or by highlighting of the image as it is displayed using 3-dimensional video techniques). The possible stopped reel images displayed may also be exaggerated based on those images already displayed, if any, i.e., according to whether the image to be displayed could be combined with the images already displayed to complete a configuration of images which would result in an in-game or a game outcome which would result in a value payout.

While the reels are "spinning," the controller 160 determines the game piece identities, the game outcome, and the images to be displayed for each of the game pieces at block 208. Alternatively, the central controller 104 may make these determinations. As a further alternative, the images may be selected before the reels are started "spinning."

At block 210, the controller 160 causes the display unit 120 to display a final stopped reel image (in the form a smiling face) for one of the spinning reel images (see FIG. 14), simulating the stopping of the reel. The controller 160 then makes a determination at block 212 whether the game piece corresponding to the stopped reel image represents a potential winning configuration. If the controller 160 determines at block 212 that the game piece represents a potential winning configuration (the image "matches" one of the images in a "winning" combination of images), then at a block 214, the controller 160 causes one or more stimulations to be provided to the player. For example, the controller 160 may control the display unit 120 to display an animated or altered version of the image originally displayed for the stopped reel (e.g., compare the smiling face of FIG. 14 with the corresponding image in FIG. 16), or to display a more highly animated version of the image originally displayed if the image was originally animated. The controller 160 may also control the display unit 120 to display an animated border about the reels (compare the border regions of FIGS. 13-18). The controller 160 may control the speakers 134 to provide an aural stimulation, the aroma dispenser 136 to provide an aromatic stimulation, and/or the printer 140 or other payout device to provide a value stimulation in response to the determination made at block 212. After providing the stimulation, the controller determines at block 216 whether the game has been completed (whether all of the reels have been "stopped"). According to this discussion, the controller determines that the game is not complete, and returns to block 210 to display the next stopped reel image and make the next determination at block 212.

The reels may be stopped from left to right, from the perspective of the player, or in any other manner or sequence with any number of reels stopping at the same time. Moreover, the reels may be stopped at times and/or in a sequence determined by the player, for example, through the use of an input device such as a "stop spin" button or a touch screen (on which the images of the reels are displayed). Also, as the player uses an input device, such as the "stop spin" button, an aural or visual stimulation, such as a bell tone, may be provided. As shown in FIGS. 14-18, the reels are stopped left to right one at a time without player interaction.

Figure 14:
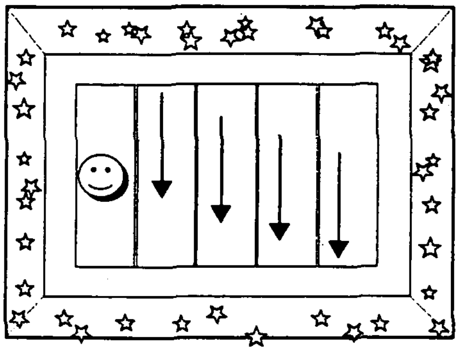
FIG. 14 is an illustration of spinning and stopped reel images that may be displayed according to a first state when the controller of FIG. 8 performs the video slots routine of FIG. 12.
Figure 15:
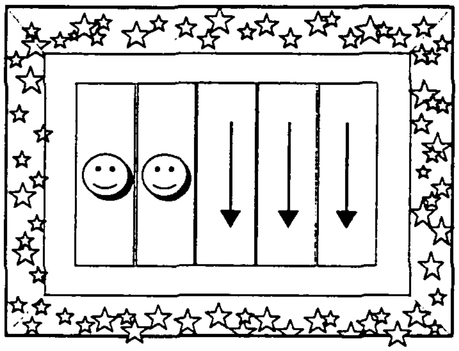
FIG. 15 is an illustration of spinning and stopped reel images that may be displayed according to a second state when the controller of FIG. 8 performs the video slots routine of FIG. 12.
Figure 16:
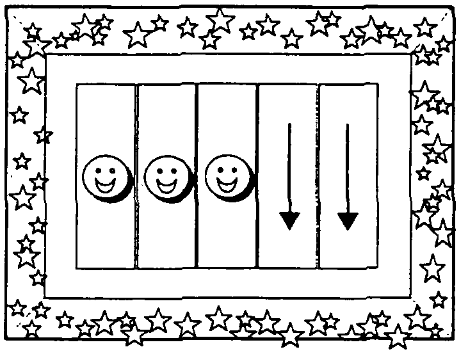
FIG. 16 is an illustration of spinning and stopped reel images that may be displayed according to a third state when the controller of FIG. 8 performs the video slots routine of FIG. 12.
Figure 17:
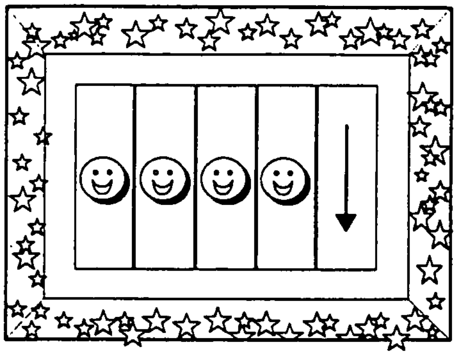
FIG. 17 is an illustration of spinning and stopped reel images that may be displayed according to a fourth state when the controller of FIG. 8 performs the video slots routine of FIG. 12.
Figure 18:
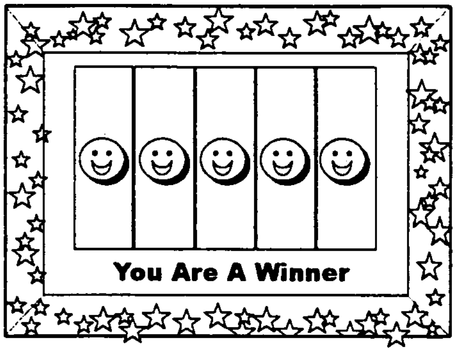
FIG. 18 is an illustration of spinning and stopped reel images that may be displayed according to a fifth state when the controller of FIG. 8 performs the video slots routine of FIG. 12.

As shown in FIGS. 15-18, with each additional determination of a potential winning configuration, the controller 160 controls the display unit 120 to display images that are more and more animated (e.g., compare the game piece images of FIG. 14 with FIG. 16). The border around the reels (e.g., compare the borders of FIGS. 14-18) also becomes more animated. Different colors and brightness levels may also be used (e.g., compare FIG. 15 with FIG. 16, and then FIG. 16 with FIG. 17). Additionally, textual messages may be displayed on the display unit 120, which messages may change (e.g., "You're almost there!" changes to "YOU'RE A WINNER!" when a final qualifying event takes place) or animate (e.g., the individual letters move up and down as if jumping for joy) with each additional qualifying event.

In fact, as noted above, it may be desirable to prioritize the stimulations and to provide the stimulations sequentially instead of simultaneously, to omit some stimulations altogether, or to combine the stimulations to avoid conflicting stimulations. Moreover, the gaming unit may be programmed to permit the choice of stimulations to be provided to be determined by the player through the actuation of an input device, such as a button or touch screen. For example, the player may choose a particular style of stimulations reflecting a particular cultural influence so as to provide the most pleasing sensory experience for the player (e.g., the player may desire to have the cartoon character images displayed instead of more traditional symbols, or classical music played instead of bluegrass).

Further, as noted above, the images representing the still spinning reels may-change with each stopped reel image that corresponds to a "winning" combination of images. For example, with each additional determination of a potential winning configuration, the spinning reel images may increase in speed, may increase in brightness, change in size so as to appear to swell widthwise or lengthwise, or show symbols from matching combinations as they spin past on the reels, for example. Alternatively, a given reel may be "emphasized" by "de-emphasizing" the remaining reels, for example by varying the relative speeds, brightness, etc. As a further alternative, an image may be "emphasized" by "de-emphasizing" the remaining images on the reel. Moreover, the controller 160 may cause an aural stimulation to be provided via the speakers (such as by playing "Everything's Coming Up Roses"), visual stimulation to be provided via additional display units or visual indicators (such as by causing an auxiliary display unit display an image of a rose or a light bezel to flash red), an aromatic (or physical) stimulation to be provided via the aroma dispenser (such as by providing a mist of a rose-scented perfume) and/or a value payout.

Figure 19:
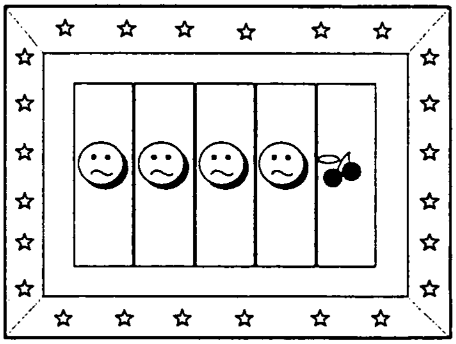
FIG. 19 is an illustration of spinning and stopped reel images that may be displayed according to an alternate state when the controller of FIG. 8 performs the video slots routine of FIG. 12.

In the alternative, if the controller 160 determines at block 212 that the game pieces do not represent a winning or potential winning configuration (the stopped reel images do not "match" a "winning" combination), the controller 160 may still provide some type of stimulation in response at block 218. For example, the controller 160 might, as shown in FIG. 19, animate the previously smiling images to frown. At the same time, the brightness and animation of the border may also be decreased. Also, there might be a smaller or no payout based on the failure to match a "winning" combination of images.

When it is determined at a block 216 that all of the events have been performed, the controller 160 exits the slots routine 188*a* and returns to the main routine 180 shown in FIG. 11. Alternatively, before exiting the slots routine 188*a*, the controller 160 may, as a further reward stimulation for example, cause the speakers 134 to announce "Let's see that again!" and the display unit 120 to replay the game (blocks 210, 212, 214, 216, 218), complete with the events and stimulations provided during the game (except for the value stimulation, which may be only provided during game play, although it is possible to provide further value stimulation as well during the game replay). Similarly, such a replay could be used during game play, for example between the state illustrated in FIG. 17 and that illustrated in FIG. 18 to heighten the suspense of the display of the last reel at FIG. 18.

Figure 20:
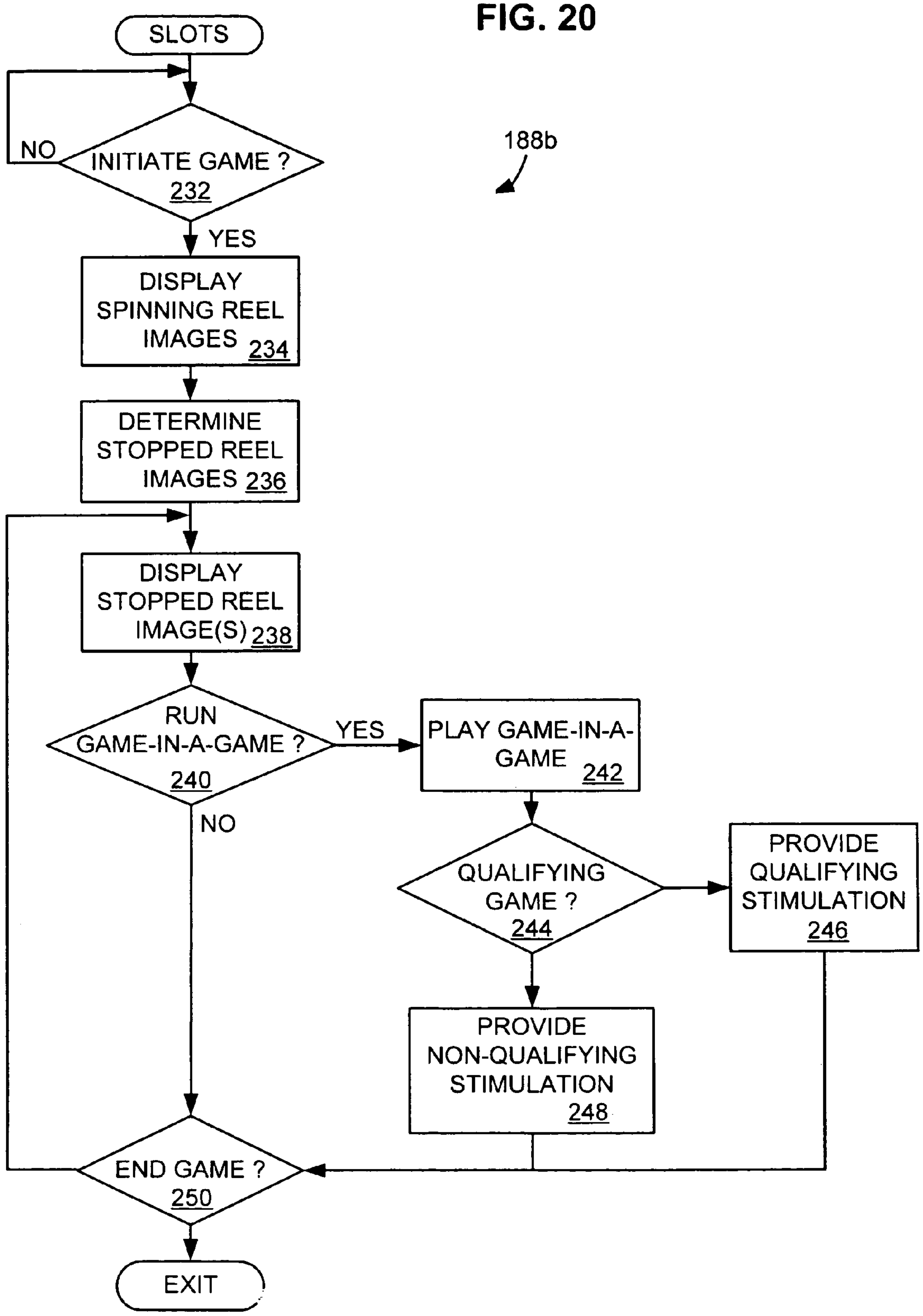
FIG. 20 is a flowchart of an alternative video slots routine that may be performed by the controller of FIG. 8.
Figure 21:
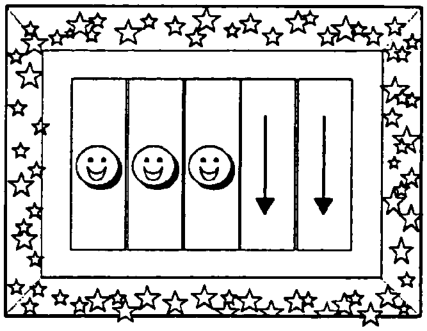
FIG. 21 is an illustration of spinning reel images and a stopped reel image that may be displayed according to a first state when the controller of FIG. 8 performs the video slots routine of FIG. 20.

An alternative video slot routine 188*b* is shown in FIG. 20. The alternative video slot routine 188*b* is similar to the slot routine 188*a*, but provides additional game play not available in the routine 188*a* for even heightened in-game stimulation. The additional game play is provided in the form of one or more additional determinations and/or game pieces that may or may not influence the determination as to whether a payoff should be made for the game which the player is playing. These one or more additional determinations and/or game pieces may be described as defining a "game" separate or in combination with the game that is being played.

In a preferred form of the routine, the one or more additional determinations and/or game pieces define a separate game the results of which do not necessarily influence the game that the player is playing. Moreover, in a preferred form of the routine, the one or more additional determinations and/or game pieces include a single additional determination.

More specifically, again with reference to FIG. 20, the controller 160 determines at block 232 if the game has been initiated. When the controller 160 determines that the game has been initiated at block 232, the controller 160 controls the display unit 120 to display images of spinning reels while the controller 160 determines the stopped reel images at block 234. The controller 160 determines the images to be displayed as stopped reel images at a block 236. At block 238, the controller 160 controls the display unit 120 to display one of the stopped reel images in accordance with the stopped reel images determined at block 236.

The controller 160 then determines at block 240 whether the one or more determinations and/or game pieces will be provided in addition to the game pieces that make up the game. The determination may be made to provide the additional determinations and/or game pieces because the game pieces of the original game are in a potential winning configuration. Alternatively, the determination may be made to provide the additional determinations and/or game pieces because the game pieces of the original game are in a non-winning configuration. As a further alternative, the additional game play may be triggered by some other event, or may occur in all cases. If the controller 160 determines at block 240 that the additional determinations and/or game pieces are to be provided, then the controller 160 controls the gaming unit 102 to provide the additional determinations and/or game pieces at block 242.

Figure 22:
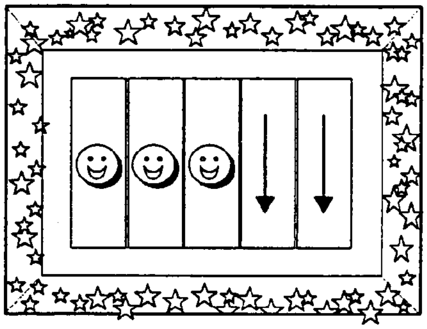
FIG. 22 is an illustration of spinning reel images and a stopped reel image that may be displayed according to a second state when the controller of FIG. 8 performs the video slots routine of FIG. 20.
Figure 23:
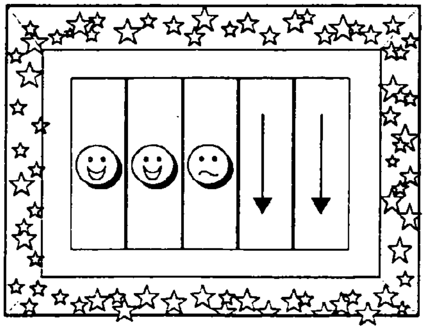
FIG. 23 is an illustration of spinning reel images and another stopped reel image that may be displayed according to a second state when the controller of FIG. 8 performs the video slots routine of FIG. 20.
Figure 24:
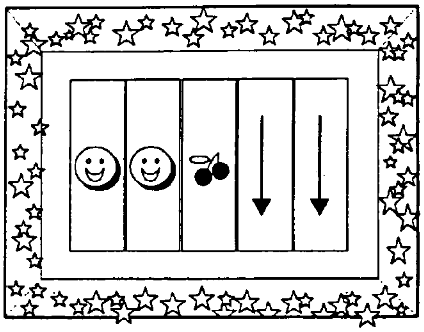
FIG. 24 is an illustration of spinning reel images and still another stopped reel image that may be displayed according to a second state when the controller of FIG. 8 performs the video slots routine of FIG. 20.

The additional determinations and/or game pieces provided at block 242 may form games that vary in complexity and subject matter. For example, the game may include an independent determination of whether one or more (in this case, one) of the original game pieces represent a new winning configuration of game pieces for the "game-in-a-game," and this determination may be influenced by the player, for example, through the depression of a "stop spin" button or the like. At the same time, the controller 160 may control the display unit 120 so that to the player it appears as though one of the previously stopped reels is again "spinning" through a plurality of images, some of which match the original stopped reel image (e.g., compare the third game piece image of FIG. 21 with the corresponding image in FIG. 22) and others that do not match (e.g., compare the third game image (smiling face) of FIG. 21 with the corresponding images in FIGS. 23 and 24 (frowning face and cherries, respectively)). Based on the determination made of whether the original game piece represents a new winning configuration, the controller 160 may then determine which one of these images to display as a second stopped reel image, and display the second stopped reel image.

The controller 160 also determines at block 244 if the configuration of the original game piece is a qualifying event. For example, a winning combination may be defined as a qualifying event. For a qualifying event, the player may receive a stimulation, whether aural, visual, value or other, at block 246. For a non-qualifying event, a stimulation may still be provided at block 248, but typically not a value stimulation.

Alternatively, according to another embodiment, the controller 160 may control the gaming unit 102 to provide the determinations and game pieces necessary to play a hand of blackjack at block 242. That is, the controller 160 "deals" two hands of two cards one of which is the player's hand, permits the player to draw additional cards to be combined in determining the value of the player's hand, and determines if the value of the player's cards equals 21 or at least exceeds the other hand of cards ("a win") or if the value of the player's cards exceeds 21 or does not exceed the other hand of cards ("a loss").

According to still another embodiment, after several of a plurality of reels have "stopped," the player may be given the option to choose one of the reel images and be awarded a stimulation depending upon a predetermined, random, etc. assignment of stimulations to the reels. For example, in an adaptation on the familiar "shell game," each of the stopped reel images may be in the form of a hat or shell, and the player may be allowed to select one of the hats or shells. Depending on the selection, the player may be provided with a value payout, an aural stimulation, etc., or no additional stimulation. Afterwards, game play proceeds with the stopping of the other reels and other events and the providing of a final payout.

Whether or not the steps shown in blocks 242, 244, 246, 248 have been performed, the controller 160 determines at block 150 if the game is completed. If the game is not completed, then the controller returns to block 238 and displays the next stopped reel image and makes the next determination.

As a further modification to the alternative routine 188*b* described above, the routine 188*b* may provide a stimulation separate from the game play represented by the blocks 242, 244, 246, 248. That is, because it may be desirable that only certain events (e.g. only certain potential winning configurations) trigger the performance of the steps shown in blocks 242, 244, 246, 248, it may still be desirable to provide some stimulation representative of, for example, a potential winning combination even if the potential winning combination does not result in the game play of blocks 242, 244, 246, 248.

Video Poker

Figure 25A:
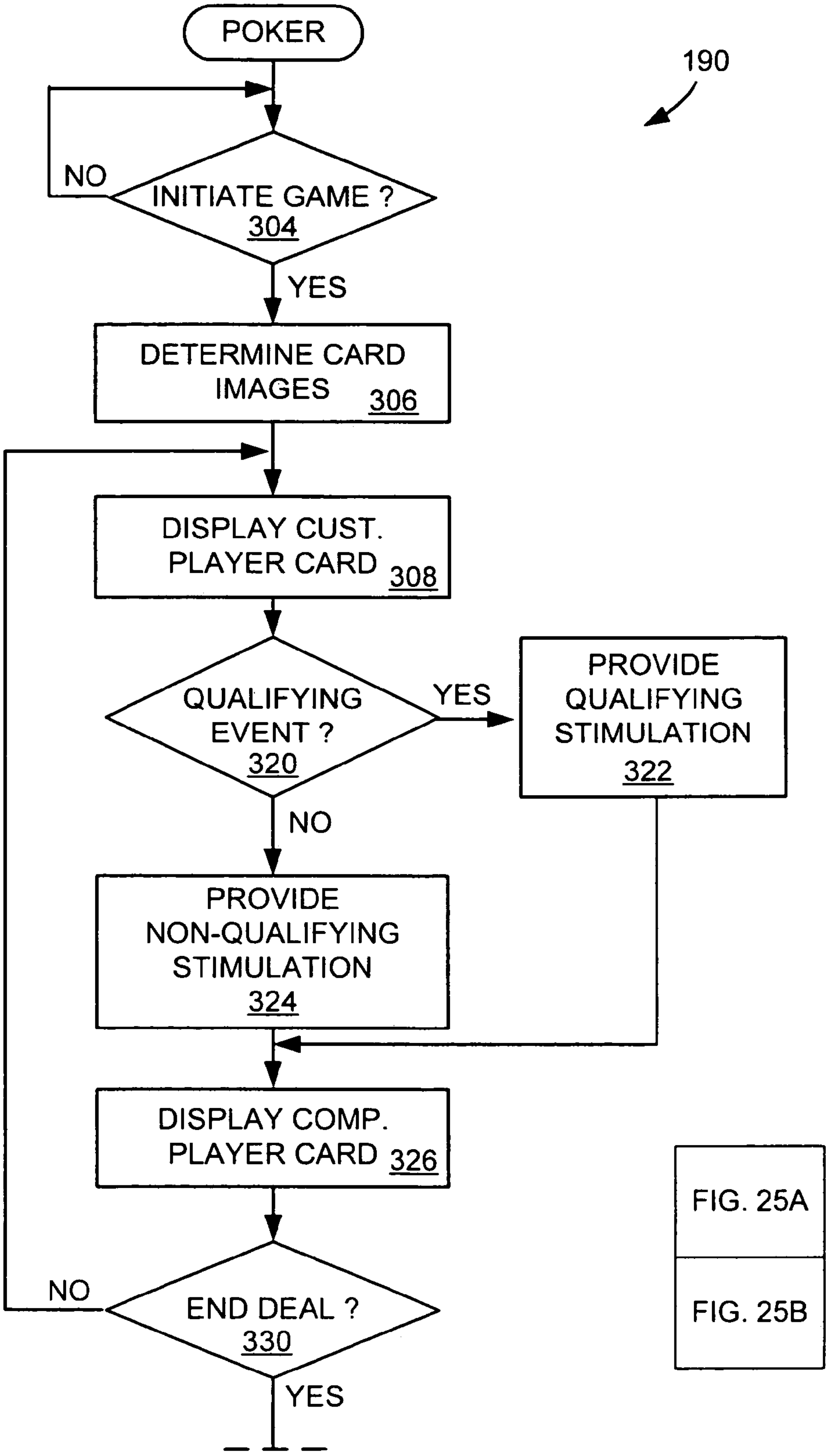
FIG. 25*a-b* is a flowchart of a video poker routine that may be performed by the controller of FIG. 8.
Figure 25B:
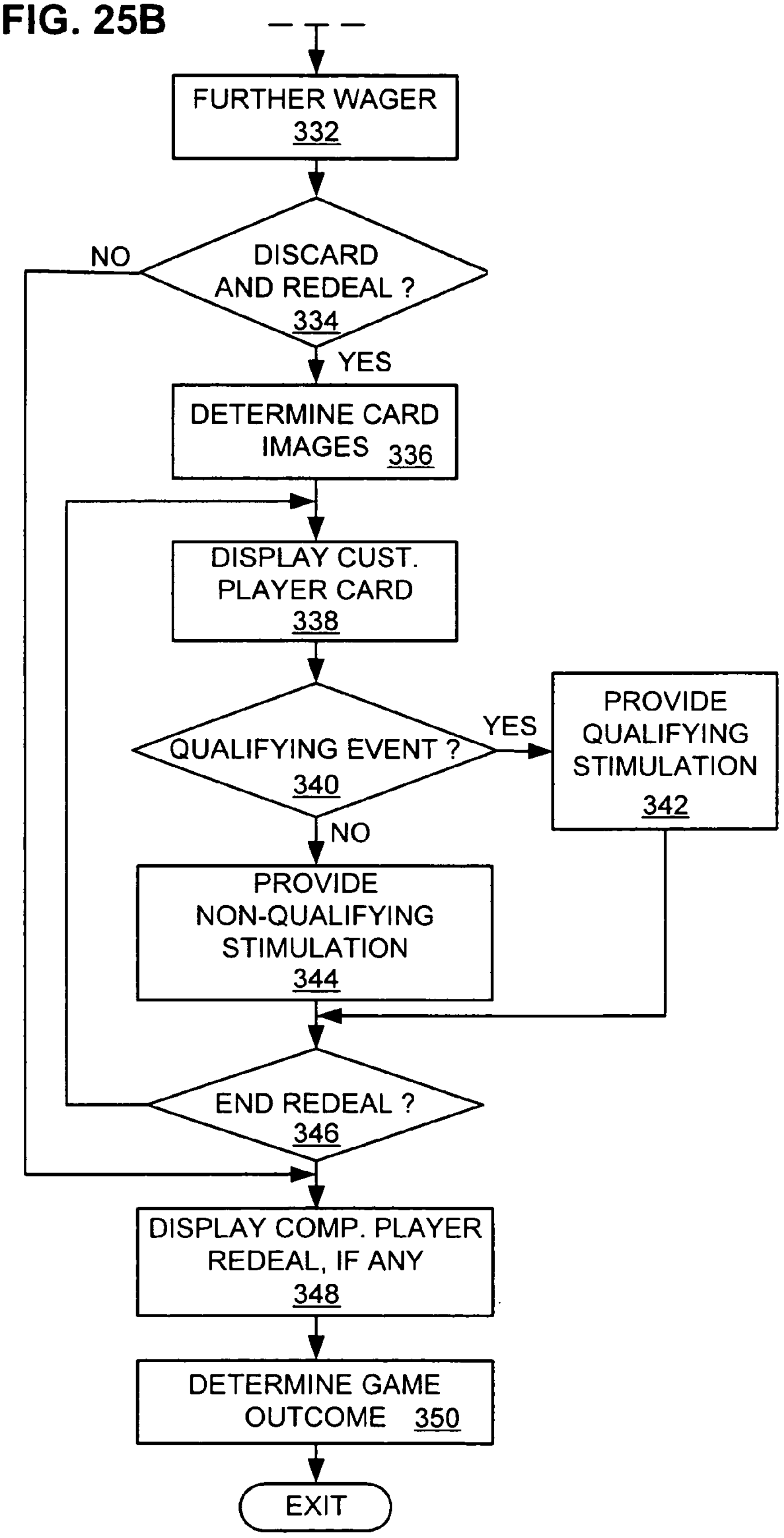

As further illustration, FIG. 25 shows a flowchart of an embodiment 190 of the video poker routine shown schematically in FIG. 11. To simplify the discussion, reference is made to the game play as it is generally viewed by the player, rather than all of the operations performed by the controller 160 during the game play.

Referring to FIG. 25, at block 304, the player initiates the game. At block 306, the controller 160 may select images representing two or more sets of playing cards (i.e., "hands of cards to be dealt") according to a set of randomly generated numbers, each number corresponding to one of the cards in a standard deck. Alternatively, as explained above, the central controller 104 may generate the randomly generated numbers and/or assign the cards corresponding to the numbers instead of the controller 160. For ease of illustration, a variation is discussed wherein the dealer receives one hand of cards, and the player receives one hand of cards.

Figure 26:
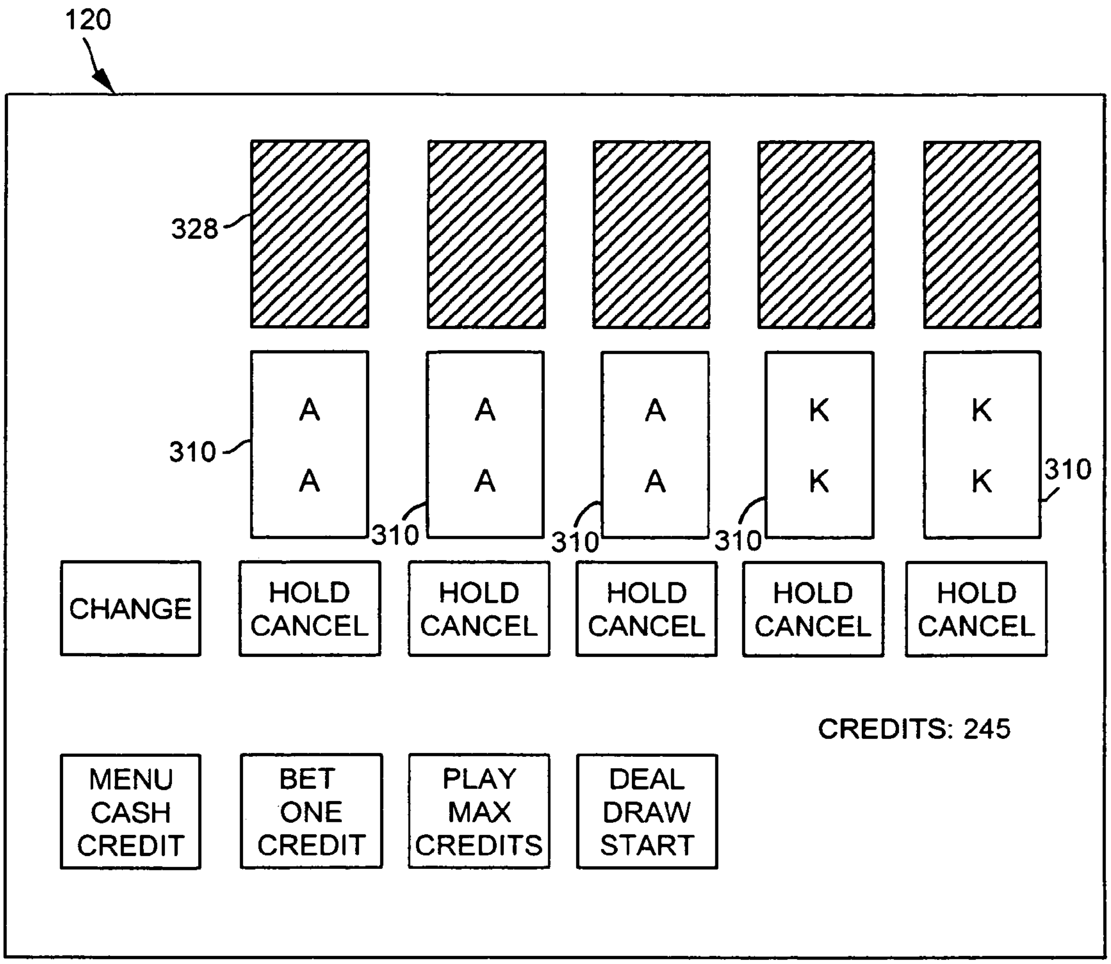
FIG. 26 is an illustration of a visual display that may be displayed when the controller of FIG. 8 performs the video poker routine of FIG. 25*a-b.*

The controller 160 causes the display unit 120 to display a first game piece image representing a face-up playing card 310 (see FIG. 26) at a block 308. The game piece image 310 is one of a plurality of game piece images 312, 314, 316, 318 displayed on the display unit 120, each game piece image representing a face-up playing card and the game piece images collectively representing a hand of cards.

As each card is dealt at block 308, the controller 160 determines at block 320 whether the game piece image 310, for example, corresponds to a combination of images ("a winning hand"). For example, the controller 160 may determine at block 320 whether the game piece image 310 corresponds to an ace, where the ace is part of the combination of images. If it is determined that the game piece image 310 is an ace, then at block 322, a stimulation is provided to the player. As noted above, the stimulation may be visual, aural, physical and/or value. As also noted above, a different stimulation may be provided at block 324 if the controller 160 determines at block 320 that the game piece image is not an ace. In either alternative, the controller 160 then preferably causes the display unit 120 to display at block 326 a game piece image representing a face-down playing card 328 to the dealer.

The controller 160 performs the steps at blocks 308, 320, 322, 324, 326 until the controller 160 determines at a block 330 that all of the game piece images have been displayed (i.e., "the hands have been dealt"). After the hands have been dealt, the player may have an opportunity at block 332 to increase the initial wager. At block 334, the player may be allowed to discard and draw new cards in an attempt to improve the player's poker hand. If the player chooses to discard and redeal, the controller 160 will perform steps at blocks 336, 338, 340, 342, 344, 346 similar to those at blocks 306, 308, 320, 322, 324, 330. At block 348, the dealer may be allowed to discard and draw new cards in an attempt to improve its poker hand.

At block 350, the controller 160 may determine the outcome of the poker game and a corresponding payout while causing the display unit 120 to display the face-up game piece images of the cards in the dealer's hand. If the player has won the game (i.e. the player's hand is better than the dealer's hand), the payout will be positive. If the player has not won the game, the player may forfeit the wager(s) made. The routine 190 then exits to the main routine 180.

In addition to the routines outlined above, it will be recognized that visual, aural, physical, and/or value stimulation may be provided after each of the player's cards are dealt or turned over during the determination step at block 350, as well as when each of the dealer's cards are dealt. For example, if the player has a single pair of aces and the dealer turns over its third king, the controller 160 may cause the player's aces to animate such that the symbols on the game piece image spin and a sound of a tub draining or bacon frying is played on the speakers 134. Alternatively, controller 160 may cause the display unit 120 to animate the kings on the dealer's cards and cause the speakers 134 to play the sound of snickering.

While routines have been explained above regarding slots and poker, one will recognize that similar modifications can be made for the other games named above (blackjack, keno, and bingo), as well as other games such as othello, pachinko, video pachinko, pinball, video pinball, etc. For example, the rules of pachinko permit multiple games to be played in parallel (see Brosnan et al. "Parallel Games on a Gaming Device," U.S. Ser. No. 09/553,437 filed in the U.S. Patent and Trademark Office on Apr. 19, 2000, which is incorporated herein by reference in its entirety). In such a case, the in-game stimulation for one game (or ball) may be made dependent upon the in-game or end-game play of another game (or ball). A similar parallel gaming possibility may be presented for a slot gaming unit, for example, capable of playing multiple, separate slot games at the same time.

Moreover, while certain stimulations and stimulators have been discussed, other simulations and stimulators are possible. For example, more than one video display unit 120 may be provided, as might a video display unit 120 having a partitioned screen or a combination of a video display unit 120 with a set of physical reel devices. Other visual stimulators, such as reels, top boxes, toppers, candles, light bezels (to animate, flash or track), button lights and dispenser lights, may also be provided. Additionally, the aural stimulations may be simple (i.e., emanating from a single point) or multi-dimension (i.e., appearing to emanate from multiple points in space or from a source which is moving in two-dimensional space or three-dimensional space). Other physical stimulations may be provided, such as chair movement and/or shaking, machine shuttering, topper and top box element movement, fog, smoke, steam, sparks, and fireworks. Moreover, peripheral units, such as player tracking devices, that have their own display units, lights, speakers, etc. may be coupled to the gaming units according to the embodiments discussed above, and the gaming unit may control these stimulators as well in response to in-game and game determinations made.

Moreover, the exact order of the processing of the steps during game play discussed above is not intended to be limiting. For example, as noted above, while it is shown that the controller 64, 104, 160 makes an individual determination regarding the game piece or game piece image as the game piece image is displayed, the determination may be made before the game piece image is displayed. Moreover, the disclosure also embraces an embodiment wherein all of the in-game and game determinations are made separately but at a single time. Additionally, the timing of the display of the game piece image and the stimulation may be such that the game piece image and stimulation are provided at the same time, the game piece image slightly ahead of the stimulation, or the stimulation slightly ahead of the game piece image.

Additionally, while the routines disclosed herein start with the placement of a wager, the embodiments of the present invention are not so limited. For example, as a reward for previous play or a successful conclusion to a previous game, the player may receive a "bonus" or "free" game, i.e., a game wherein a payout may be made without a wager being placed, or a "re-spin" of selected reels, i.e., the controller determines new game pieces for reels already "stopped." In such a case, the gaming unit may automatically start the "bonus" game upon the completion of the previous game. Alternatively, the game unit may be programmed to permit the player to input an initial value, set a wager amount, and then play a series of games, the gaming unit automatically deducting the wager amount from the initial value entered (and any winnings which may have accumulated) at the initiation of each additional game without the player making an additional wager determination.

Further, in combination with any of the preceding routines or as part of a further alternative routine, the player may be permitted to change a characteristic of the game piece image during game play so as to define an altered game piece image and an altered game piece. For example, the player may be permitted, under certain circumstances, to change a stopped reel image or to change the color of the suit of one playing card image during game play, with an attendant change in the associated game piece. As a further alternative, the player may be permitted to "re-spin" the reels already "stopped," i.e. have the controller determine new game pieces for the reels already stopped and combine those new game pieces with the game pieces previously determined and not yet displayed. The player may indicate his or her desire to change the characteristics of a game piece through any manner of input device, for example, a button or a touch screen. The altered game piece is then used in combination with the other game pieces to determine the in-game outcome and the game outcome, although the payout may be modified to take into account the fact that the player changed a game piece.

By providing stimulation during game play, rather that just at the completion of all of the events of the game, it is believed that the player will remain interested in the game because of the attention-grabbing stimulations during the game. As a further consequence, it is believed that the player will, if the gaming unit is a multi-game unit, play other games on the unit to determine what other stimulations are possible. Moreover, it is believed that the player will return to the gaming unit using the stimulation method according to the disclosure because of the stimulations provided during game play.

Modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

The invention claimed is:

1. A method of operating a gaming apparatus, said method comprising:

for a play of a game associated with a set of a plurality of reels each associated with a plurality of symbols:

(a) causing at least one processor to execute a plurality of instructions to operate with at least one display device to display each of the reels of the set spinning;

(b) causing the at least one processor to execute the plurality of instructions to operate with the at least one display device to stop at least one, but fewer than all, of the spinning reels of the set from spinning such that, for each stopped reel, at least one of the symbols associated with said stopped reel is displayed;

(c) after at least one of the reels of the set stops spinning but before each of the reels of the set stops spinning, causing the at least one processor to execute the plurality of instructions to:

(i) determine whether the symbols displayed in association with the one or more stopped reels form part of a designated symbol combination; and (ii) if it is determined that the symbols displayed in association with the one or more stopped reels form part of the designated symbol combination, operate with the at least one display device to, before each of the reels of the set stops spinning, increase a speed at which at least one spinning reel is spinning; and (d) after each reel of the set has stopped spinning, causing the at least one processor to execute the plurality of instructions to determine whether any winning symbol combinations are displayed and operate with the at least one display device to display any awards associated with any displayed winning symbol combinations.

2. The method of claim 1, further comprising causing the at least one processor to execute the plurality of instructions to, after at least one of the reels of the set stops spinning but before each of the reels of the set stops spinning and if it is determined that the symbols displayed in association with the one or more stopped reels form part of the designated symbol combination, operate with at least one output device to output a sound.

3. The method of claim 2, which includes causing the at least one processor to execute the plurality of instructions to operate with the at least one display device and the at least one output device to overlappingly increase the speed at which at least one spinning reel is spinning and output the sound.

4. The method of claim 2, which includes causing the at least one processor to execute the plurality of instructions to operate with the at least one display device and the at least one output device to sequentially increase the speed at which at least one spinning reel is spinning and output the sound.

5. A gaming apparatus comprising:

at least one display device;

at least one input device;

at least one processor; and at least one memory device storing a plurality of instructions which, when executed by the at least one processor, cause the at least one processor to operate with the at least one display device and at least one input device to, for a play of a game associated with a set of a plurality of reels each associated with a plurality of symbols:

(a) display each of the reels of the set spinning;

(b) stop at least one, but fewer than all, of the spinning reels of the set from spinning such that, for each stopped reel, at least one of the symbols associated with said stopped reel is displayed;

(c) after at least one of the reels of the set stops spinning but before each of the reels of the set stops spinning:

(i) determine whether the symbols displayed in association with the one or more stopped reels form part of a designated symbol combination; and (ii) if it is determined that the symbols displayed in association with the one or more stopped reels form part of the designated symbol combination, operate with the at least one display device to, before each of the reels of the set stops spinning, increase a speed at which at least one spinning reel is spinning; and (d) after each reel of the set has stopped spinning, determine whether any winning symbol combinations are displayed and display any awards associated with any displayed winning symbol combinations.

6. The gaming apparatus according to claim 5, wherein the plurality of instructions, when executed by the at least one processor, cause the at least one processor to, after at least one of the reels of the set stops spinning but before each of the reels of the set stops spinning and if it is determined that the symbols displayed in association with the one or more stopped reels form part of the designated symbol combination, operate with at least one output device to output a sound.

7. The gaming apparatus according to claim 6, wherein the plurality of instructions, when executed by the at least one processor, cause the at least one processor to operate with the at least one display device and the at least one output device to overlappingly increase the speed at which at least one spinning reel is spinning and output the sound.

8. The gaming apparatus according to claim 6, wherein the plurality of instructions, when executed by the at least one processor, cause the at least one processor to operate with the at least one display device and the at least one output device to sequentially increase the speed at which at least one spinning reel is spinning and output the sound.

9. The gaming apparatus according to claim 5, wherein the at least one display device is selected from the group consisting of a display unit, a partitioned display unit, multiple display units, reels, top boxes, toppers, candles, light bezels, button lights and dispenser lights.

10. The gaming apparatus according to claim 5, which includes a payout device selected from the group consisting of: a coin hopper; a token hopper; a printer for printing merchandise ticket vouchers, bonus ticket vouchers, cash-redemption ticket vouchers, casino chip ticket vouchers, extra game play ticket vouchers, restaurant ticket vouchers, or show ticket vouchers; and an electronic funds transfer device.

11. A gaming system comprising a plurality of the gaming apparatuses as defined in claim 5, the gaming apparatuses being linked together to form a network selected from the group consisting of a LAN, a WAN, an intranet and the Internet.

12. The gaming system according to claim 1, wherein the gaming apparatuses are linked to a central controller.

13. The gaming system according to claim 11, wherein the gaming apparatuses are linked together to form a peer-to-peer network.

* * * * *

UNITED STATES PATENT AND TRADEMARK OFFICE

CERTIFICATE OF CORRECTION

PATENT NO. : 8,888,579 B2
APPLICATION NO. : 10/879772
DATED : November 18, 2014
INVENTOR(S) : Nicole Beaulieu et al.

It is certified that error appears in the above-identified patent and that said Letters Patent is hereby corrected as shown below:

IN THE CLAIMS

In Claim 12, Column 19, Line 27, replace “1” with --11--.

Signed and Sealed this
Fifteenth Day of March, 2016

Michelle K. Lee
*Director of the United States Patent and Trademark Office*